US006825994B2

(12) United States Patent
Harada

(10) Patent No.: US 6,825,994 B2
(45) Date of Patent: Nov. 30, 2004

(54) PHOTOGRAPHIC OPTICAL SYSTEM

(75) Inventor: Akira Harada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/421,688

(22) Filed: Apr. 24, 2003

(65) Prior Publication Data

US 2003/0210476 A1 Nov. 13, 2003

(30) Foreign Application Priority Data

May 8, 2002 (JP) ........................................ 2002-132535

(51) Int. Cl.[7] .............................. G02B 9/34; G02B 9/36
(52) U.S. Cl. ........................ 359/774; 359/771; 359/772; 359/776
(58) Field of Search ................................ 359/754, 771, 359/772, 774, 776, 733, 734, 708, 715, 698, 684, 686, 687

(56) References Cited

U.S. PATENT DOCUMENTS 4,976,523 A * 12/1990 Ishikawa .................... 359/684
5,598,299 A   1/1997 Hayakawa ................... 359/557
5,751,485 A   5/1998 Suzuki ........................ 359/557
5,790,309 A   8/1998 Ohtake ........................ 359/557
2002/0041451 A1   4/2002 Harada ......................... 359/45

FOREIGN PATENT DOCUMENTS

JP   7-294853   11/1995
JP   8-101361   4/1996
JP   8-201691   8/1996

* cited by examiner

Primary Examiner—Georgia Epps
Assistant Examiner—Jack Dinh
(74) Attorney, Agent, or Firm—Fitzpatrick, Cella, Harper & Scinto

(57) ABSTRACT

In a photographic optical system disclosed in the present invention, there are provided a first focusing part for focusing while exposure is not performed on a light-sensitive surface and a second focusing part for focusing while exposure is performed on the light-sensitive surface, wherein the second focusing part correct the displacement in focal position during exposure.

15 Claims, 18 Drawing Sheets

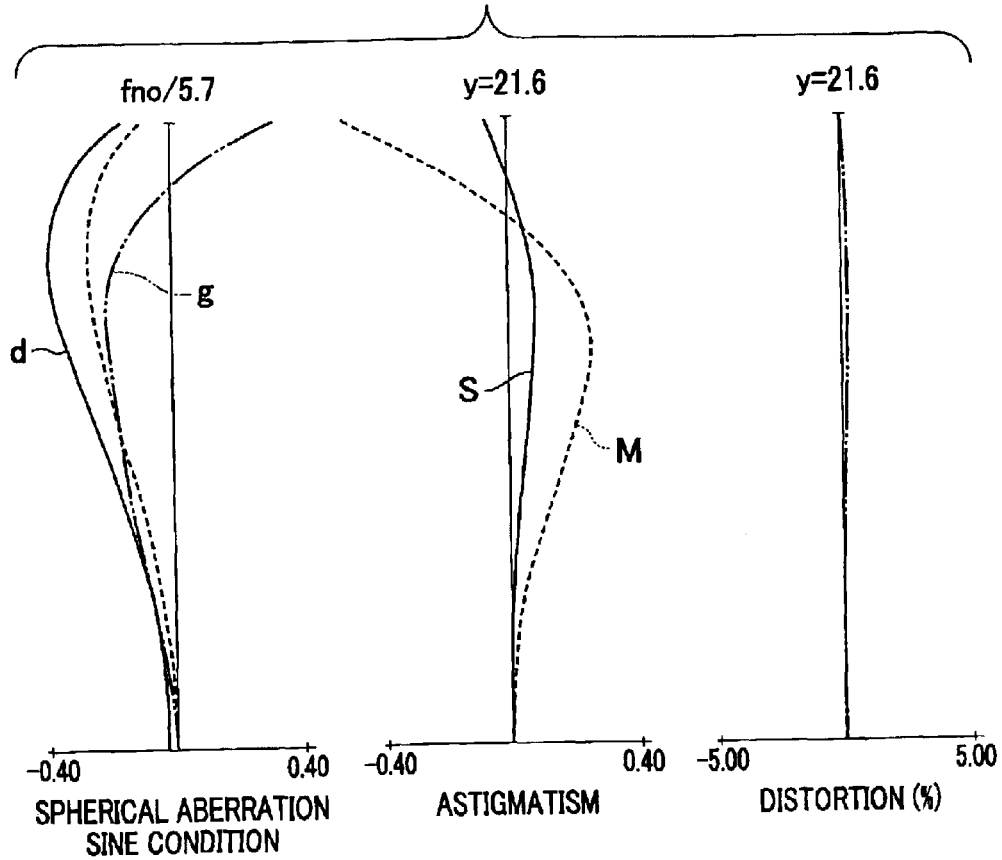
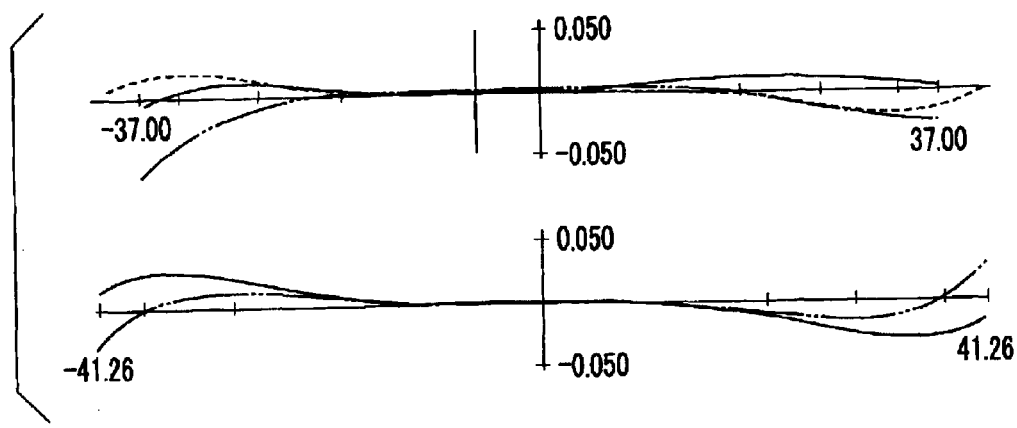

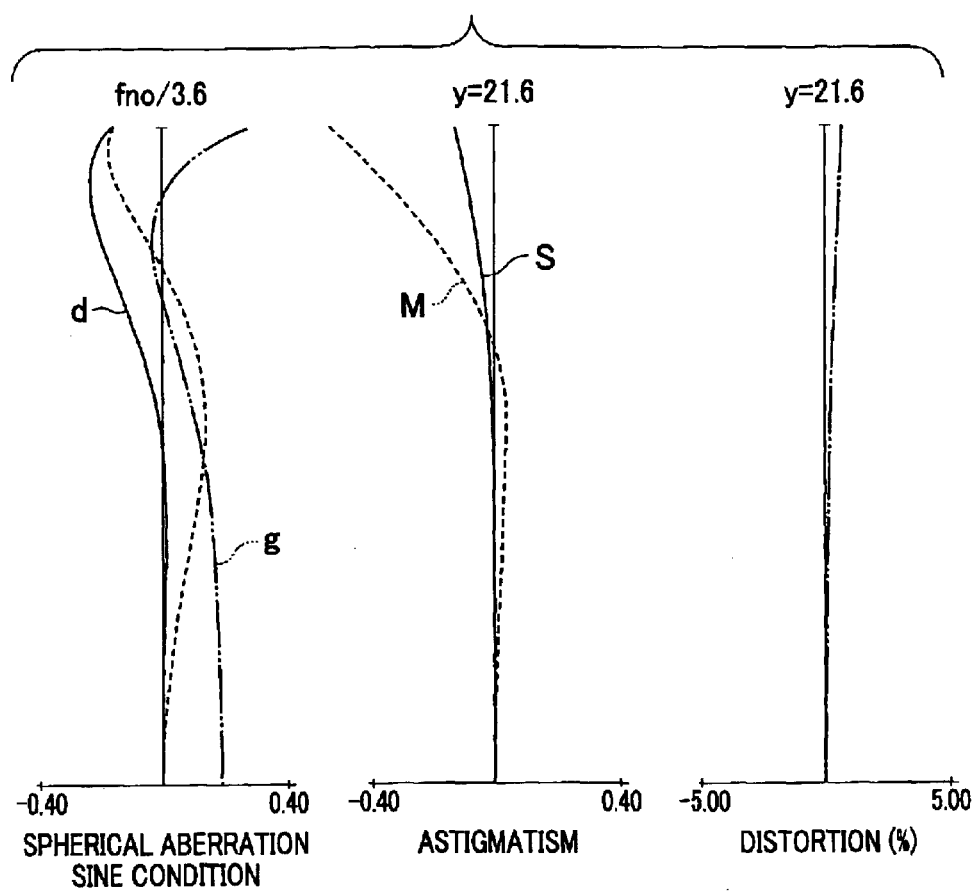
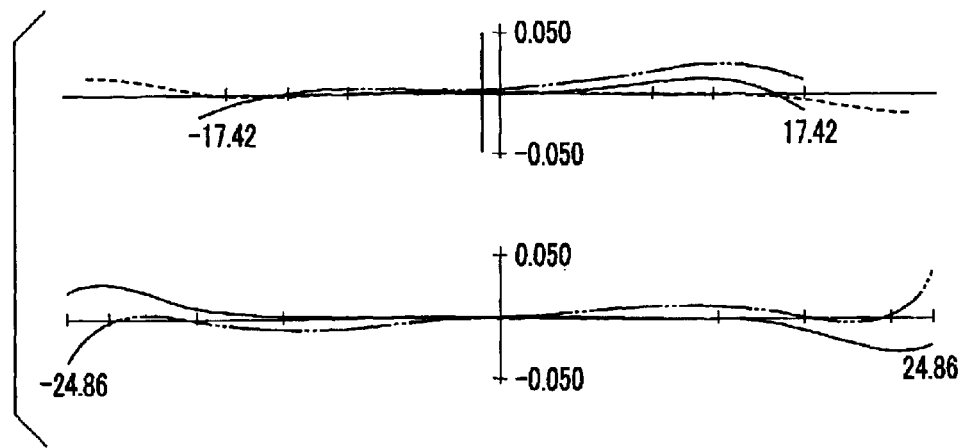

PHOTOGRAPHIC OPTICAL SYSTEM

BACKGROUND OF THE INVENTION

1. Field of the Invention

The present invention relates to photographic optical systems, and more particularly relates to a photographic optical system suitable for optical apparatuses, such as digital still cameras, video cameras, and silver-film cameras.

2. Description of the Related Art

Hitherto, in optical apparatuses, such as silver-film cameras, video cameras, and digital still cameras, a micro lens or a macro lens (hereinafter both referred to as a "macro lens") has been known as a photographic lens primarily for photographing close-up objects.

The depth of field of a macro lens is generally much less in a high-magnification photographing mode (that is, a close-up photographing mode). This makes it difficult to correct the focus using a focusing lens unit during high-magnification photography, which easily causes the imaging relationship between the optical system (the photographic lens) and an object to deviate from the in-focus state along the optical axis direction. In general, the displacement of the focal point due to the deviation in the imaging relationship between the optical system and the object from the in-focus state is corrected by a configuration which employs an auto-focus system to detect the amount of defocusing and to move the focusing lens unit so as to make fine adjustments. However, since the macro lens, which is primarily used for close-up photography, has very little depth of field, even a slight deviation of the imaging relationship between the optical system and the object during exposure on a light-sensitive surface (during photographing) may cause the image to become out of focus by more than a tolerable amount. Focusing is therefore required whenever the imaging relationship is deviated, even during exposure. In order to obtain a high photographic magnification, the macro lens generally causes a plurality of focusing lens units to move (floating) or causes a heavy focusing lens unit to move. This deteriorates the tracking ability of the focus, making it difficult to correct the defocus during exposure.

In addition, during the high-magnification photography, blurring of the photographic image plane due to camera shaking or the like becomes noticeable. In Japanese Patent Laid-Open No. 07-294853 (corresponding to U.S. Pat. No. 5,598,299), and Japanese Patent Laid-Open No. 08-201691 (corresponding to U.S. Pat. No. 5,751,485), in order to correct blurring of the photographic image plane during close-up photography (a photographic magnification of 0.5 to 1.0), there have been proposals to limit the reduced image quality due to blurring of the photographic image plane by moving some of the lens units in the direction perpendicular to the optical axis.

In Japanese Patent Laid-Open No. 08-101361 (corresponding to U.S. Pat. No. 5,790,309), there is disclosed an optical system that has a vibration-canceling unit (vibration-canceling lens unit), which is moved in the direction perpendicular to the optical axis in order to correct blurring of the photographic image plane due to decentering of the optical axis, and that moves the focusing part in accordance with the moving of the vibration-canceling unit in order to correct the displacement of the focal point during vibration canceling.

Since the depth of field of the macro lens is generally small in the high-magnification photographing mode, it is difficult to correct the focal point. Thus, there is a problem in that even a slight displacement of the object distance, particularly during photographing, causes defocus.

Furthermore, blurring of the photographic image plane due to slight camera-shaking decreases the optical performance.

SUMMARY OF THE INVENTION

It is an object of the present invention to provide a photographic lens that can rapidly correct the displacement in the focal point even though the imaging relationship deviates during photography (during exposure on the light-sensitive surface) and that can always provide superior optical performance even in, for example, a close-up photographing mode.

To this end, according to a first aspect of the present invention, there is provided a photographic optical system for forming an image of an object on a light-sensitive surface, including a first focusing part for focusing while exposure is not performed on the light-sensitive surface and a second focusing part for focusing while exposure is performed on the light-sensitive surface.

For example, a photographic optical system includes, in order from the object side to the image side thereof, a first lens unit having positive optical power, a second lens unit having negative optical power, a third lens unit having positive optical power, and a fourth lens unit having positive optical power, wherein the second lens unit moves along an optical axis toward the image, and the third lens unit moves along the optical axis toward the object while focusing from an infinity distant object to a closest object, and the fourth lens unit moves along the optical axis so as to correct the displacement in focal position while exposure is performed on the light-sensitive surface.

Further objects, features and advantages of the present invention will become apparent from the following description of the preferred embodiments with reference to the attached drawings.

BRIEF DESCRIPTION OF THE DRAWINGS

FIG. 7 consists of graphs showing the longitudinal aberration of the photographic lens according to the first embodiment in the state illustrated in FIG. 2.

FIG. 8 consists of graphs showing the transverse aberration of the photographic lens according to the first embodiment in the state illustrated in FIG. 2.

FIG. 16 consists of graphs showing the longitudinal aberration of the photographic lens according to the second embodiment in the state illustrated in FIG. 13.

FIG. 17 consists of graphs showing the transverse aberration of the photographic lens according to the second embodiment in the state illustrated in FIG. 13.

DESCRIPTION OF THE PREFERRED EMBODIMENTS

Embodiments of photographic optical systems, and optical devices (cameras) using the same, of the present invention are described with reference to the accompanying drawings.

Figure 1:
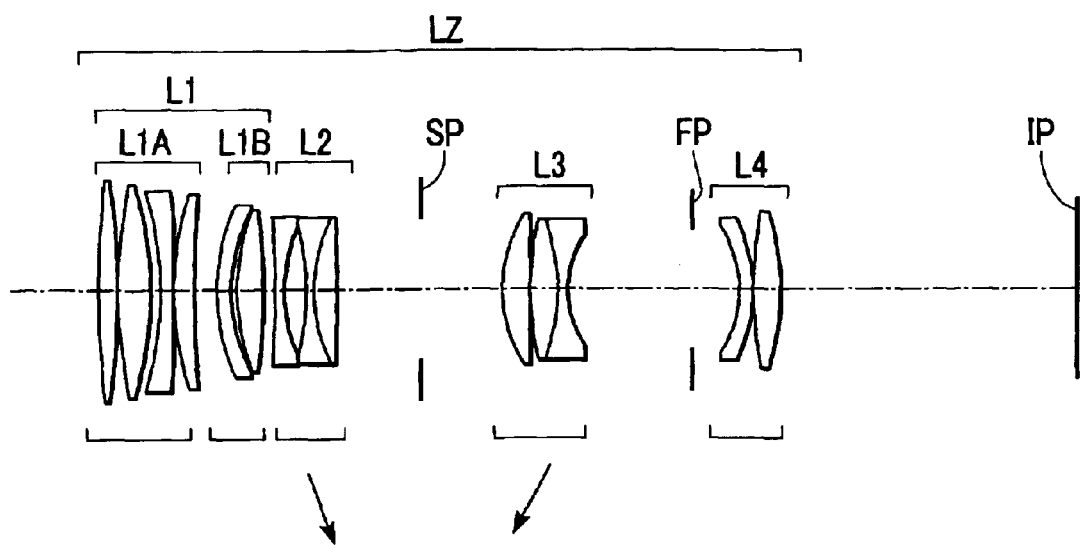
FIG. 1 is a cross sectional view of a photographic lens according to a first embodiment in a state in which an infinity distant object is focused.
Figure 2:
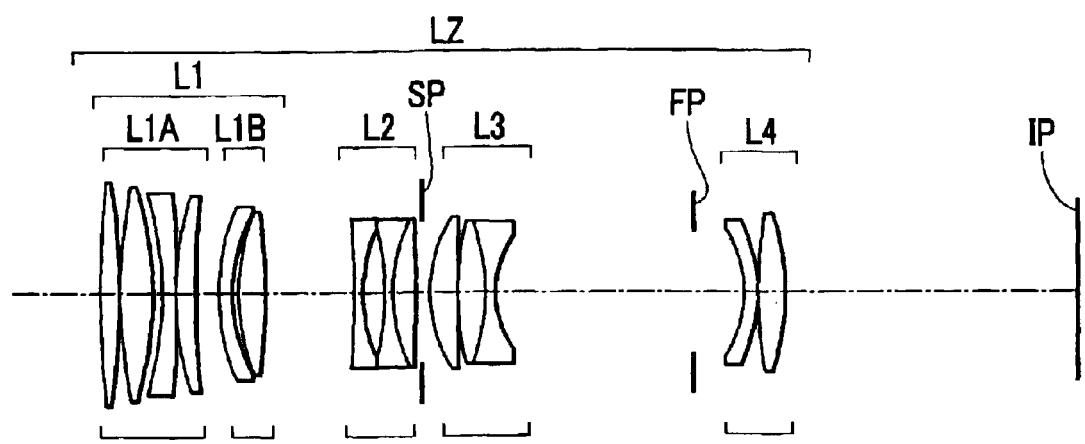
FIG. 2 is a cross sectional view of a photographic lens according to the first embodiment in a state in which a close-up (closest) object (photographic magnification $\beta=-1$) is focused.
Figure 3:
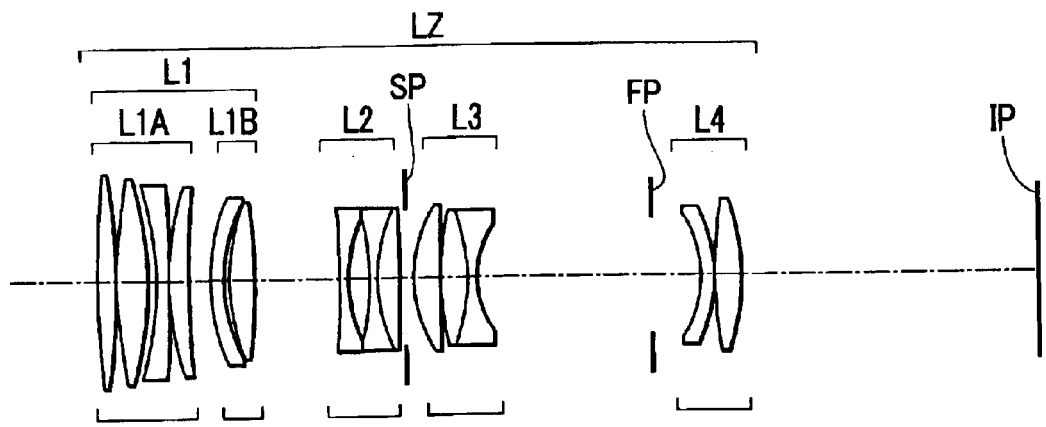
FIG. 3 is a cross sectional view of a photographic lens according to the first embodiment in a state in which a close-up object (photographic magnification $\beta=-1$) is focused (with focusing correction to the state illustrated in FIG. 2).

FIGS. 1, 2, and 3 show cross sections of a photographic lens according to a first embodiment in several states: FIG. 1 shows the state in which an infinity distant object is focused; FIG. 2 shows the state in which a close-up (closest) object (photographic magnification $\beta=-1$) is focused by moving a first focusing part (described below) from the state illustrated in FIG. 1; and FIG. 3 shows the state in which a second focusing part (described below) is moved and performs focusing when the focusing state is changed due to displacement of the object distance or displacement in the position of the photographic lens during photography in the state illustrated in FIG. 2.

Figure 4:
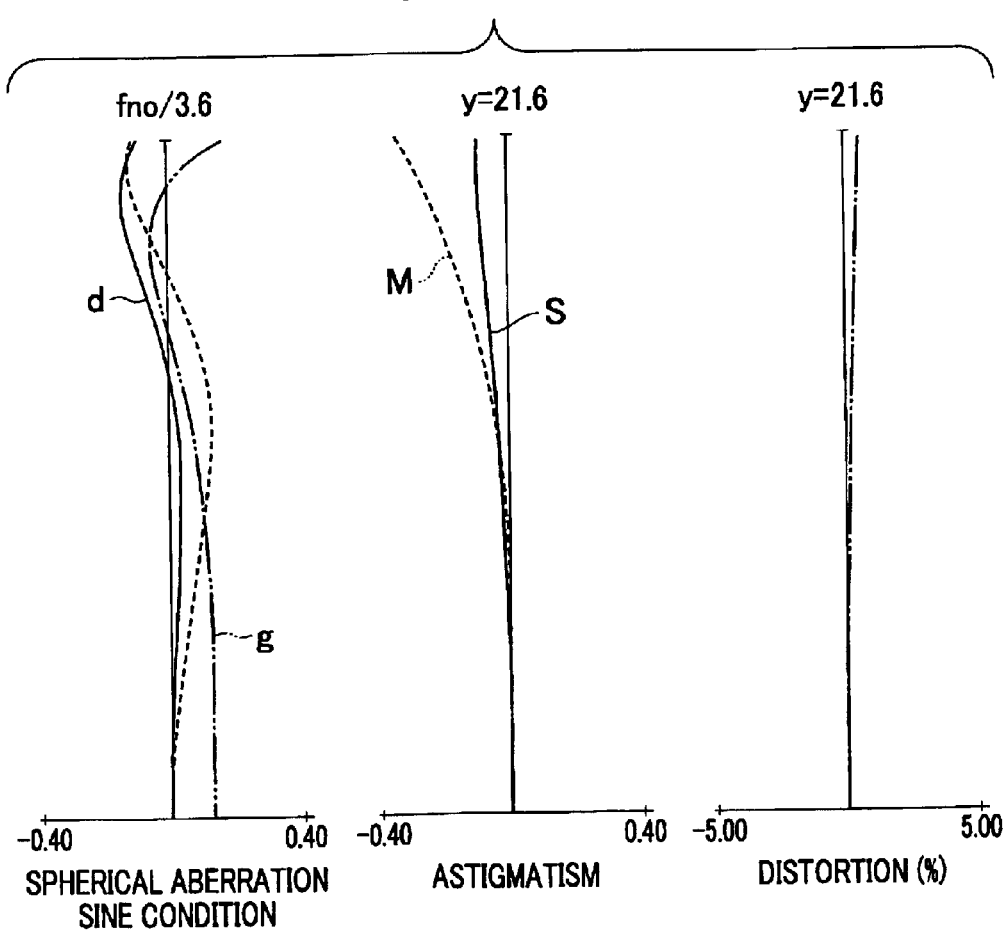
FIG. 4 consists of graphs showing the longitudinal aberration of the photographic lens according to the first embodiment in the state illustrated in FIG. 1.
Figure 5:
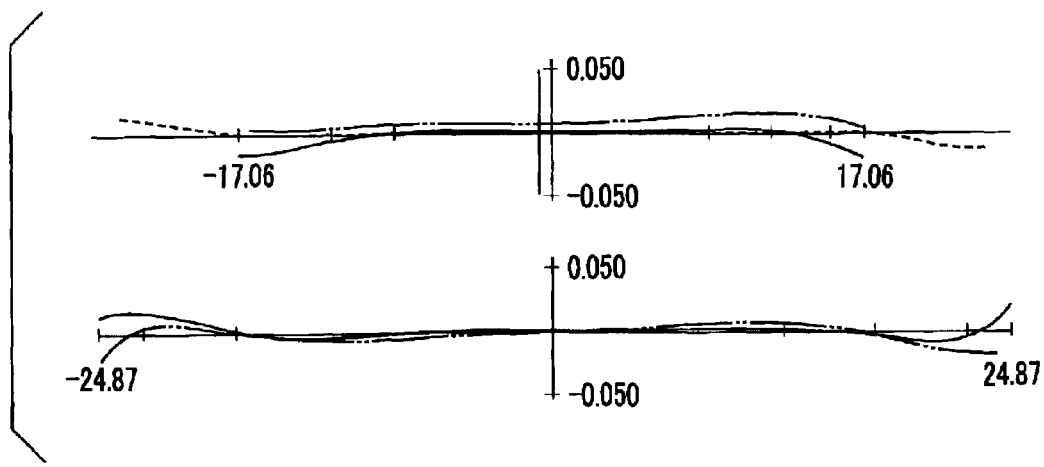
FIG. 5 consists of graphs showing the transverse aberration of the photographic lens according to the first embodiment in the state illustrated in FIG. 1.
Figure 6:
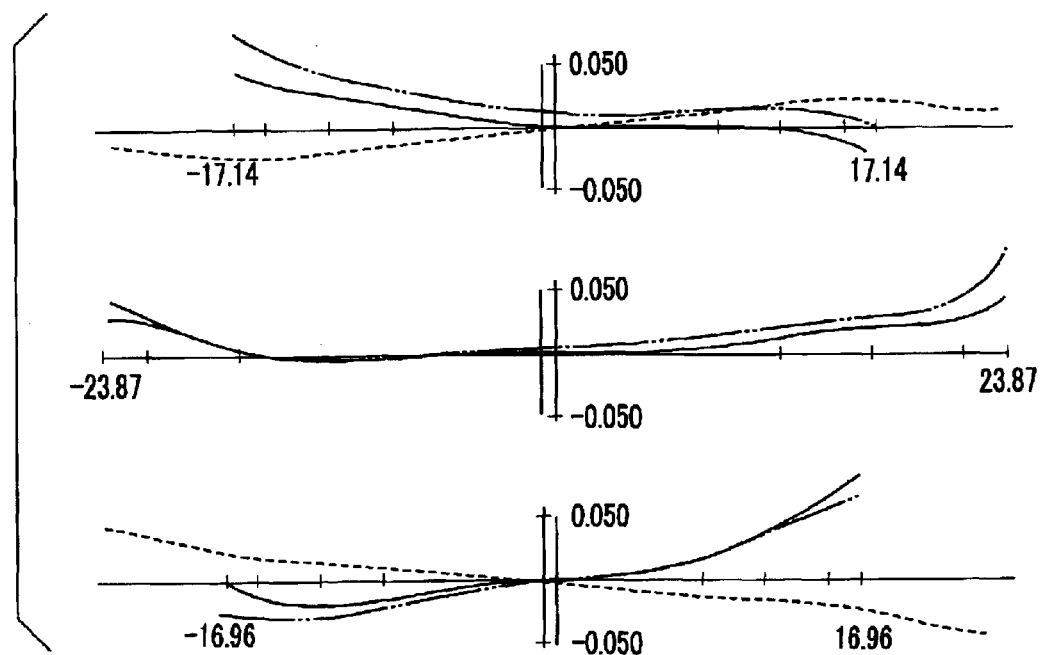
FIG. 6 consists of graphs showing the transverse aberration of the photographic lens according to the first embodiment in the state illustrated in FIG. 1 with vibration canceling (a tilt of 0.5° is corrected).
Figure 9:
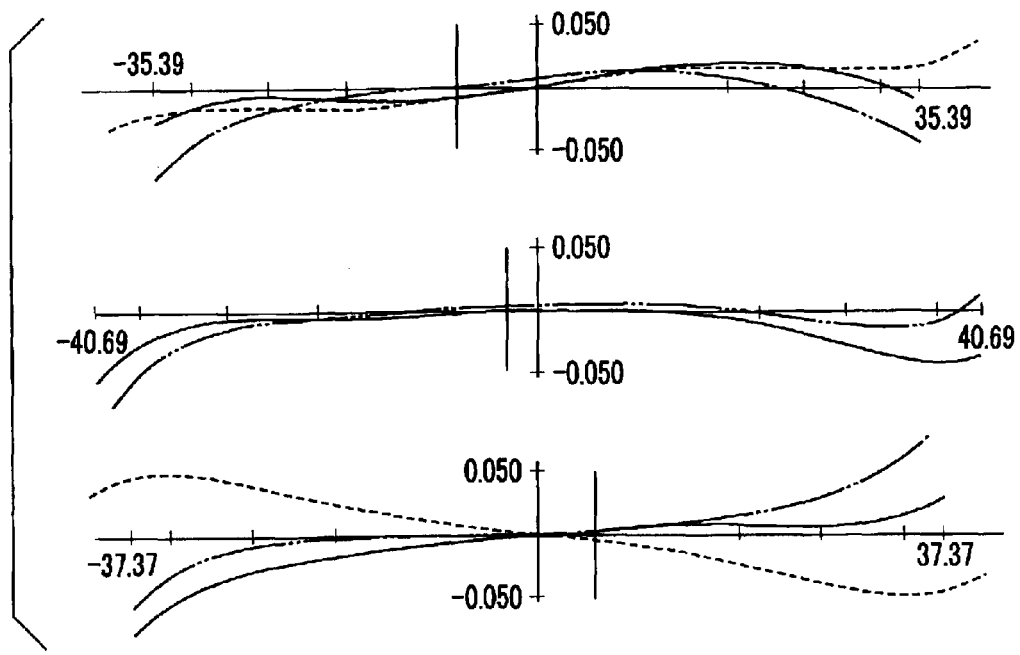
FIG. 9 consists of graphs showing the transverse aberration of the photographic lens according to the first embodiment in the state illustrated in FIG. 2 with vibration canceling (a tilt of 0.5° is corrected).
Figure 10:
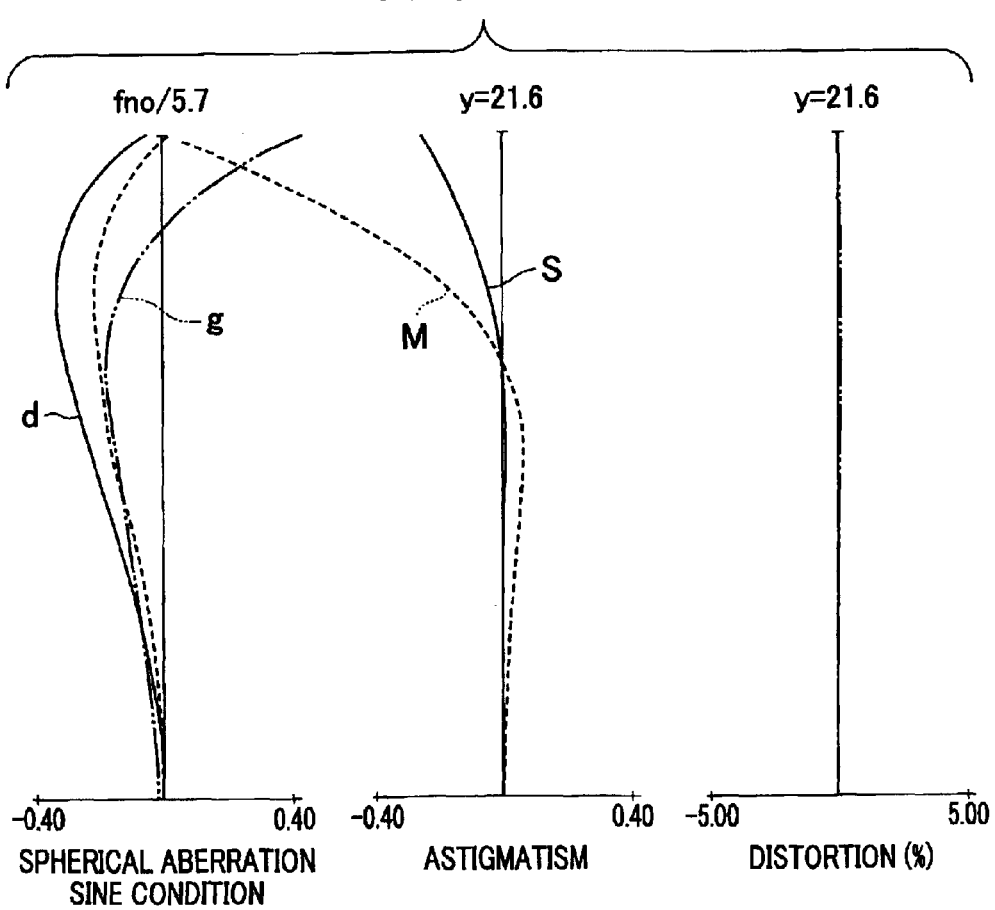
FIG. 10 consists of graphs showing the longitudinal aberration of the photographic lens according to the first embodiment in the state illustrated in FIG. 3.
Figure 11:
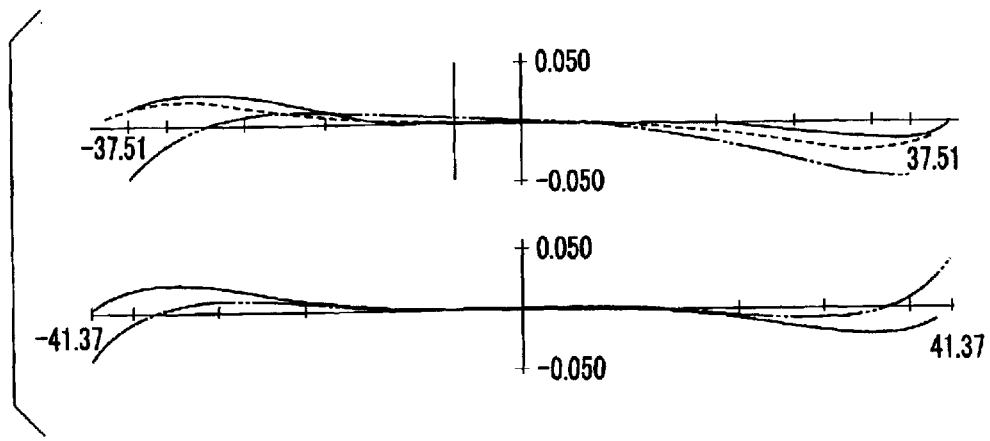
FIG. 11 consists of graphs showing the transverse aberration of the photographic lens according to the first embodiment in the state illustrated in FIG. 3.
Figure 12:
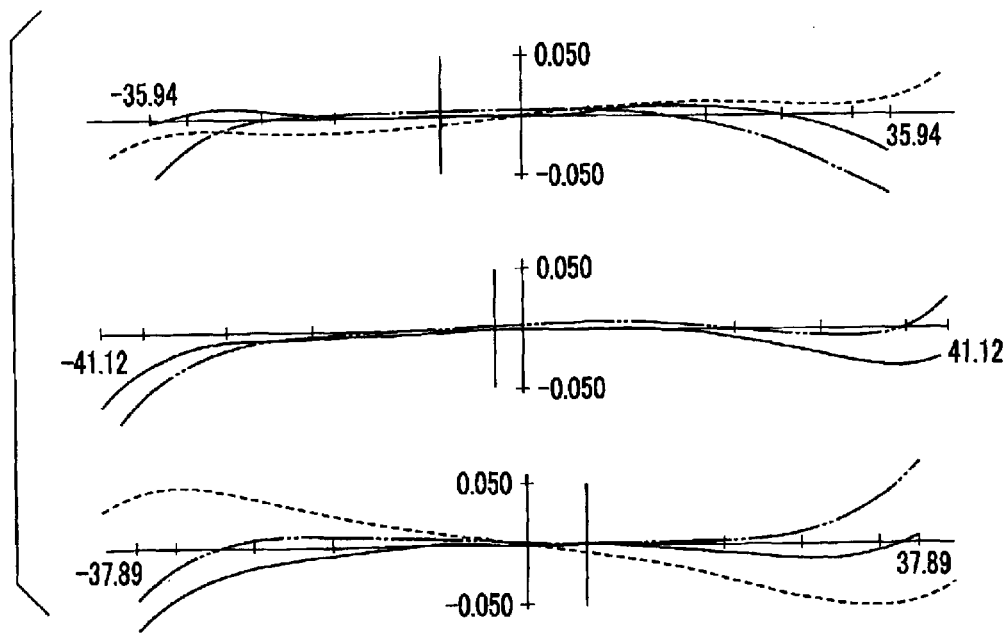
FIG. 12 consists of graphs showing the transverse aberration of the photographic lens according to the first embodiment in the state illustrated in FIG. 3 with vibration canceling (a tilt of 0.5° is corrected).

FIGS. 4 and 5 show the longitudinal aberration and the transverse aberration of the photographic lens according to the first embodiment, respectively, in the state illustrated in FIG. 1. FIG. 6 shows the transverse aberration of the photographic lens according to the first embodiment in the state illustrated in FIG. 1 with vibration canceling (a tilt of 0.5° is corrected). FIGS. 7 and 8 show the longitudinal aberration and the transverse aberration of the photographic lens according to the first embodiment, respectively, in the state illustrated in FIG. 2. FIG. 9 shows the transverse aberration of the photographic lens according to the first embodiment in the state illustrated in FIG. 2 with vibration canceling (a tilt of 0.5° is corrected). FIGS. 10 and 11 show the longitudinal aberration and the transverse aberration of the photographic lens according to the first embodiment, respectively, in the state illustrated in FIG. 3. FIG. 12 shows the transverse aberration of the photographic lens according to the first embodiment in the state illustrated in FIG. 3 with the vibration canceling (a tilt of 0.5° is corrected).

Figure 13:
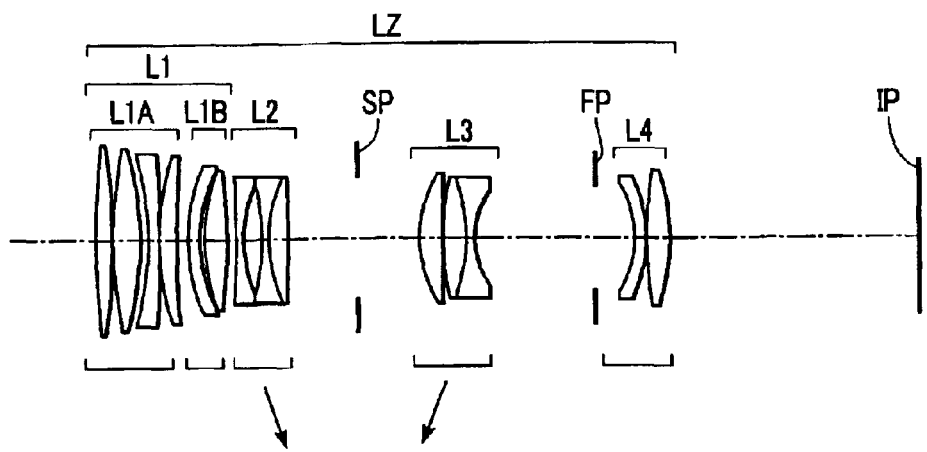
FIG. 13 is a cross sectional view of a photographic lens according to a second embodiment in a state in which an infinity distant object is focused.
Figure 14:
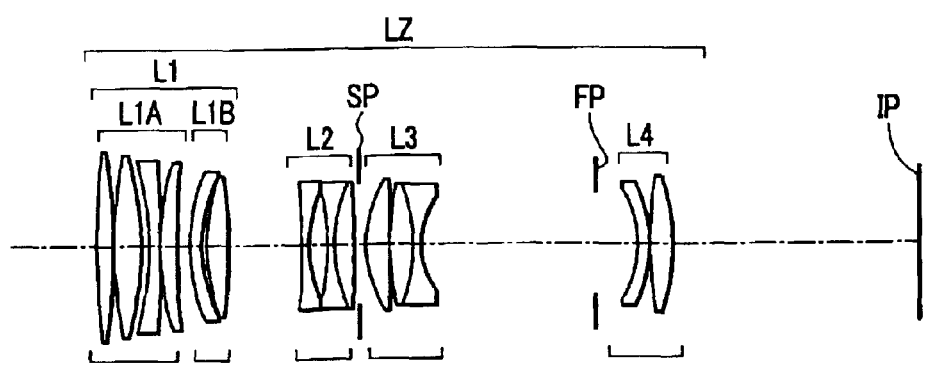
FIG. 14 is a cross sectional view of a photographic lens according to the second embodiment in a state in which a close-up object (photographic magnification $\beta=-1$) is focused.
Figure 15:
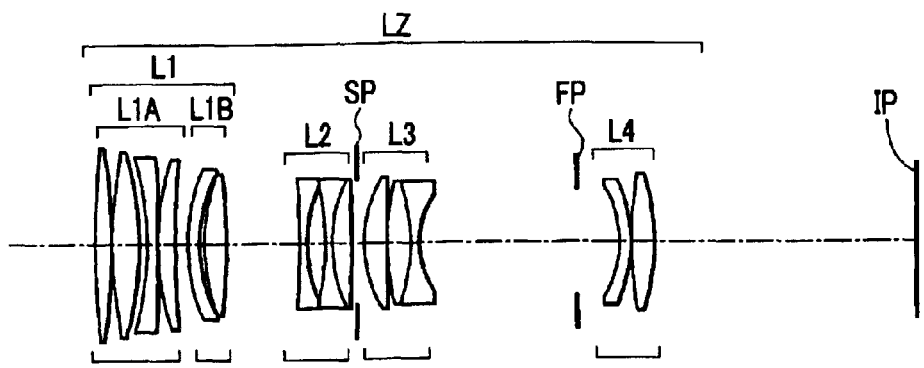
FIG. 15 is a cross sectional view of a photographic lens according to the second embodiment in a state in which a close-up object (photographic magnification $\beta=-1$) is focused (with focusing correction to the state illustrated in FIG. 2).

FIGS. 13, 14, and 15 show cross sections of a photographic lens according to a second embodiment in several states: FIG. 13 shows the state in which an infinity distant object is focused; FIG. 14 shows the state in which a close-up object (photographic magnification β=−1) is focused by moving the first focusing part; and FIG. 15 shows the state in which the second focusing part is moved and performs focusing when the focusing state is changed due to displacement of the object distance or the displacement in the position of the photographic lens during photography in the state illustrated in FIG. 14.

Figure 18:
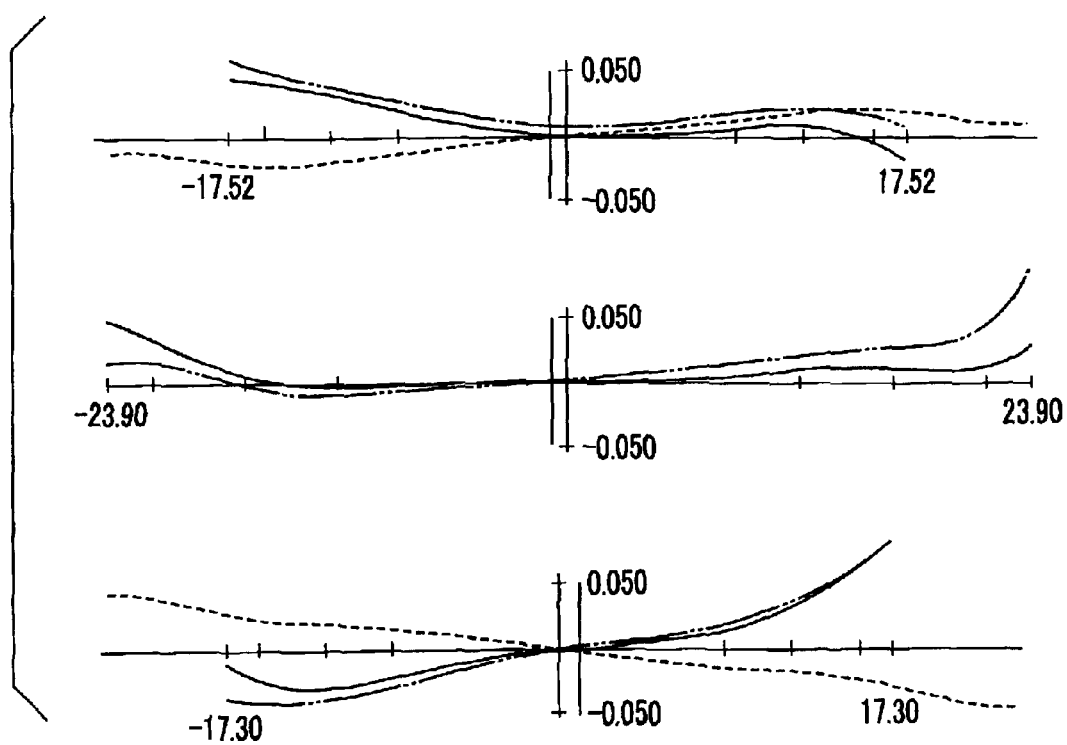
FIG. 18 consists of graphs showing the transverse aberration of the photographic lens according to the second embodiment in the state illustrated in FIG. 13 with vibration canceling (a tilt of 0.5° is corrected).
Figure 19:
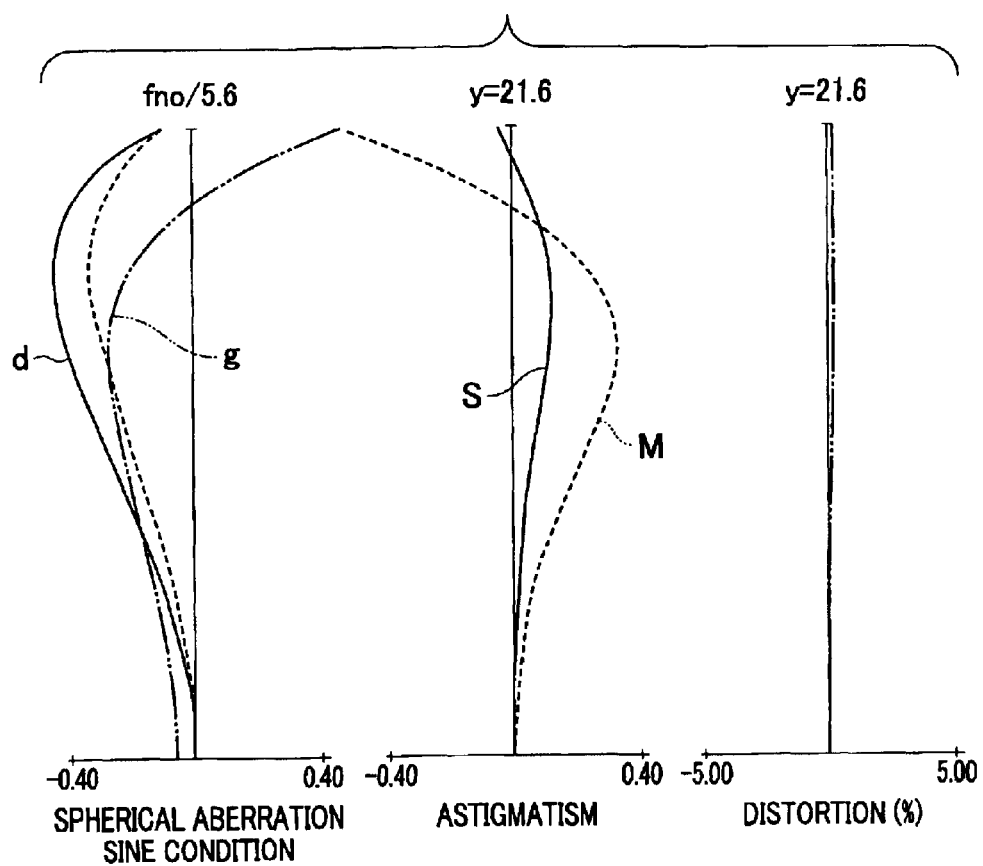
FIG. 19 consists of graphs showing the longitudinal aberration of the photographic lens according to the second embodiment in the state illustrated in FIG. 14.
Figure 20:
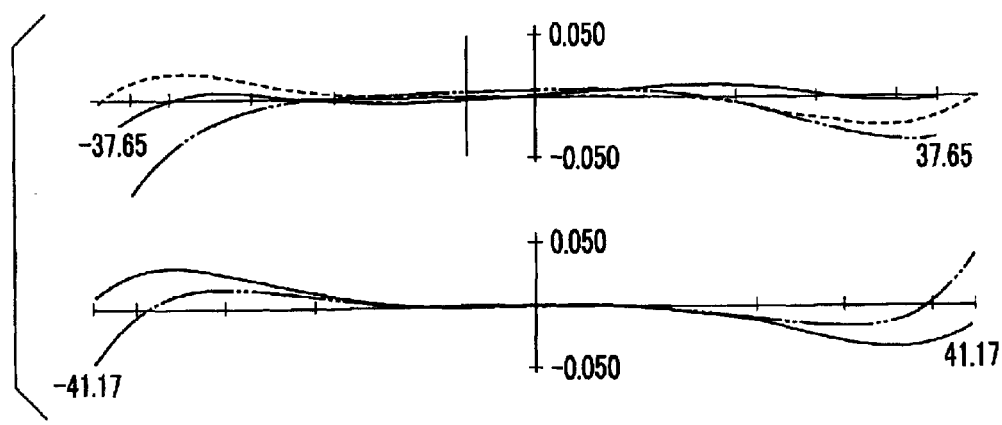
FIG. 20 consists of graphs showing the transverse aberration of the photographic lens according to the second embodiment in the state illustrated in FIG. 14.
Figure 21:
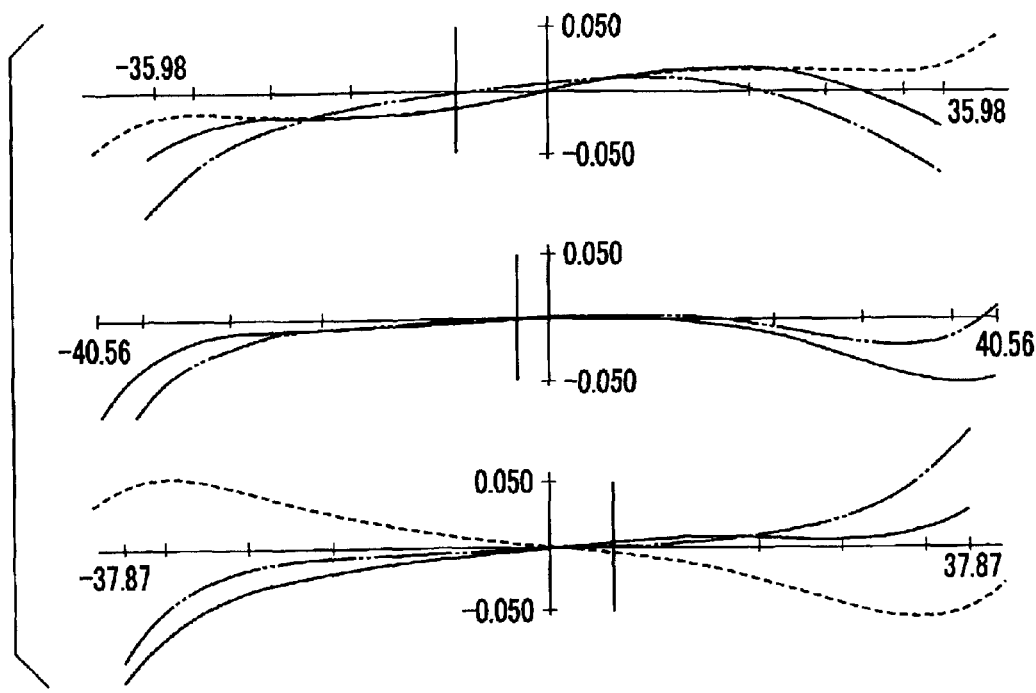
FIG. 21 consists of graphs showing the transverse aberration of the photographic lens according to the second embodiment in the state illustrated in FIG. 14 with vibration canceling (a tilt of 0.5° is corrected).
Figure 22:
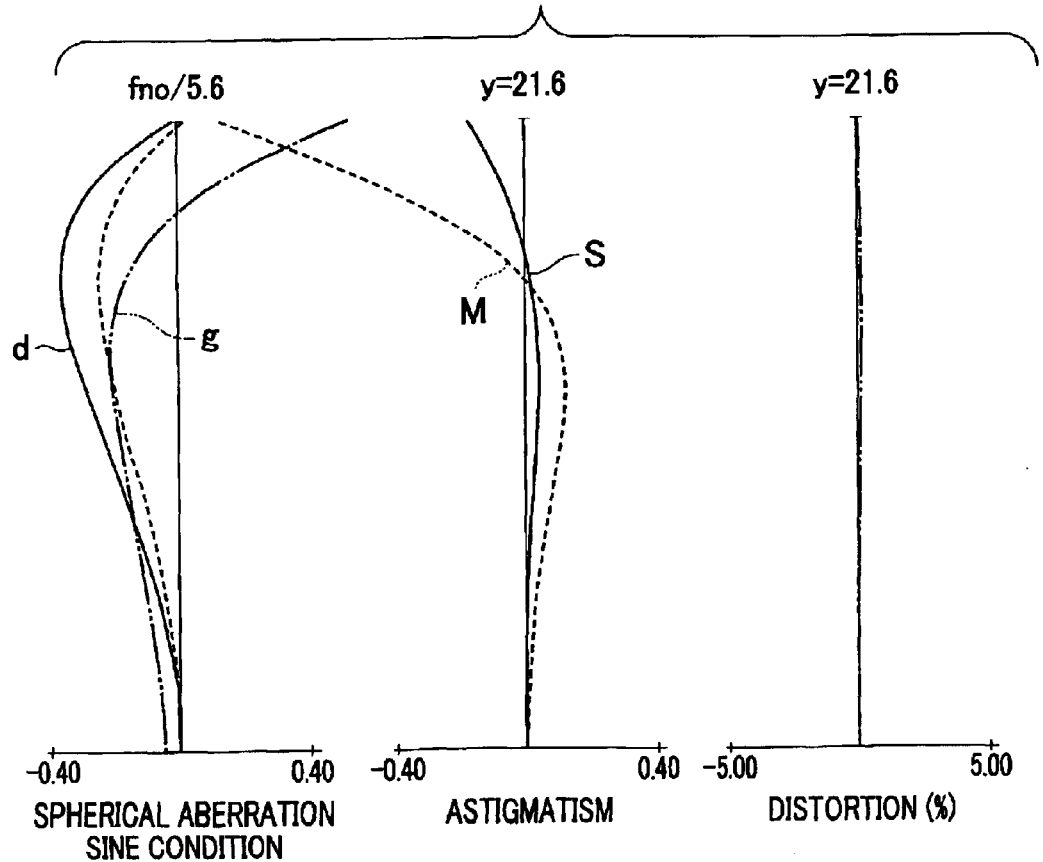
FIG. 22 consists of graphs showing the longitudinal aberration of the photographic lens according to the second embodiment in the state illustrated in FIG. 15.
Figure 23:
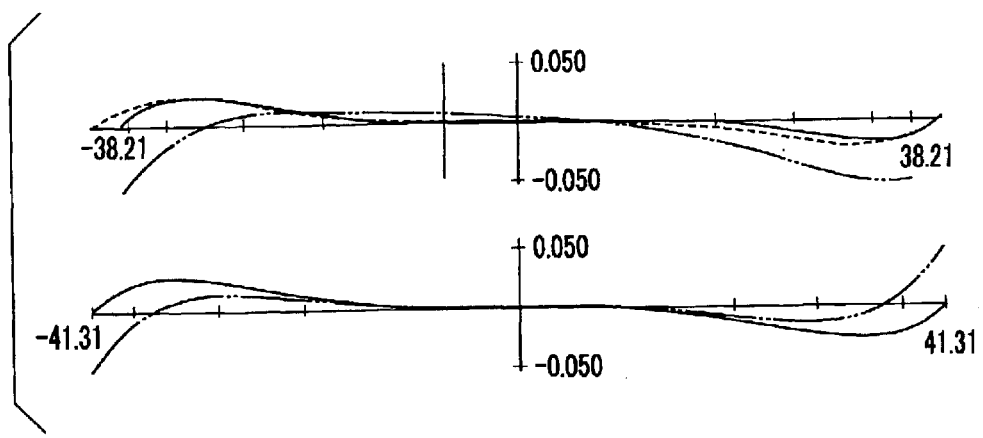
FIG. 23 consists of graphs showing the transverse aberration of the photographic lens according to the second embodiment in the state illustrated in FIG. 15.
Figure 24:
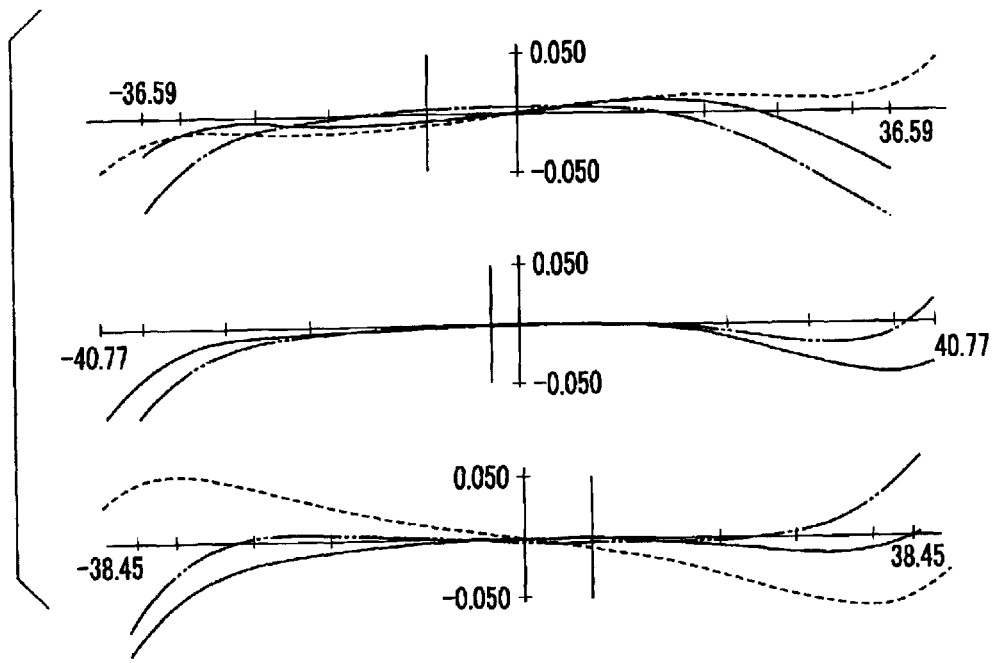
FIG. 24 consists of graphs showing the transverse aberration of the photographic lens according to the second embodiment in the state illustrated in FIG. 15 with vibration canceling (a tilt of 0.5° is corrected).

FIGS. 16 and 17 show the longitudinal aberration and the transverse aberration of the photographic lens according to the second embodiment, respectively, in the state illustrated in FIG. 13. FIG. 18 shows the transverse aberration of the photographic lens according to the second embodiment in the state illustrated in FIG. 13 with vibration canceling (a tilt of 0.5° is corrected). FIGS. 19 and 20 show the longitudinal aberration and the transverse aberration of the photographic lens according to the second embodiment, respectively, in the state illustrated in FIG. 14. FIG. 21 shows the transverse aberration of the photographic lens according to the second embodiment in the state illustrated in FIG. 14 with vibration canceling (a tilt of 0.5° is corrected). FIGS. 22 and 23 show the longitudinal aberration and the transverse aberration of the photographic lens according to the second embodiment, respectively, in the state illustrated in FIG. 15. FIG. 24 shows the transverse aberration of the photographic lens according to the second embodiment in the state illustrated in FIG. 15 with vibration canceling (a tilt of 0.5° is corrected).

Figure 25:
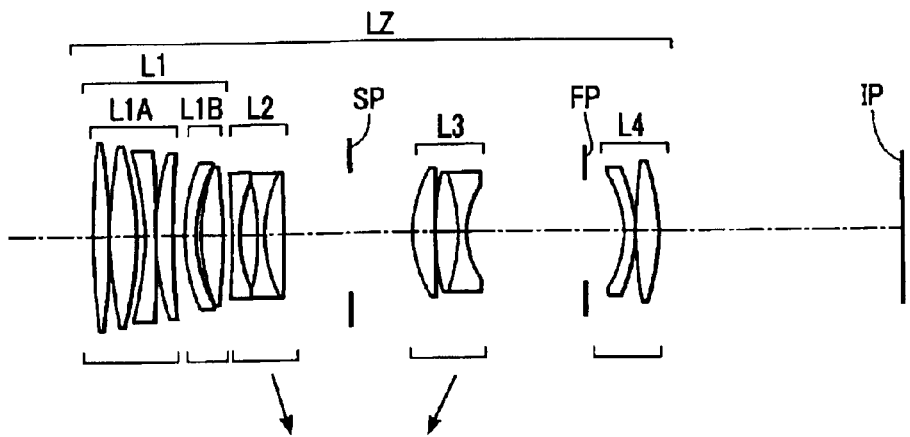
FIG. 25 is a cross sectional view of a photographic lens according to a third embodiment in a state in which an infinity distant object is focused.
Figure 26:
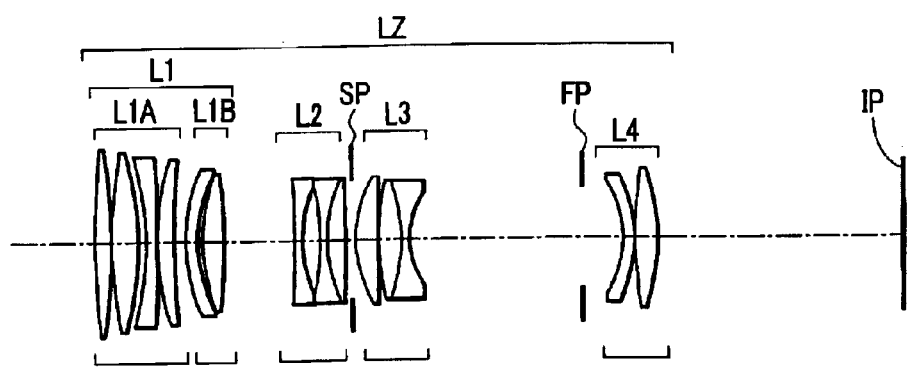
FIG. 26 is a cross sectional view of a photographic lens according to the third embodiment in a state in which a close-up object (photographic magnification $\beta=-1$) is focused.
Figure 27:
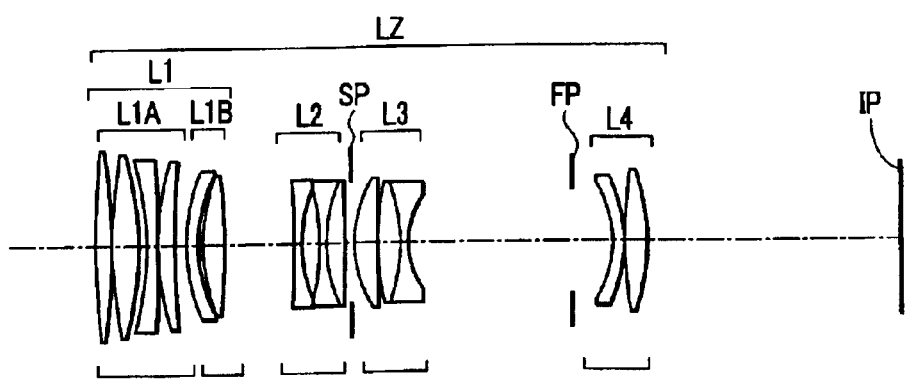
FIG. 27 is a cross sectional view of a photographic lens according to the third embodiment in a state in which a close-up object (photographic magnification $\beta=-1$) is focused (with focusing correction to the state illustrated in FIG. 2).

FIGS. 25, 26, and 27 show cross sections of a photographic lens according to a third embodiment in several states: FIG. 25 shows the state in which an infinity distant object is focused; FIG. 26 shows the state in which a close-up object (photographic magnification β=−1) is focused by moving the first focusing part; and FIG. 27 shows the state in which the second focusing part is moved and performs focusing when the focusing state is changed due to displacement of the object distance or displacement in the position of the photographic lens during photography in the state illustrated in FIG. 26.

Figure 28:
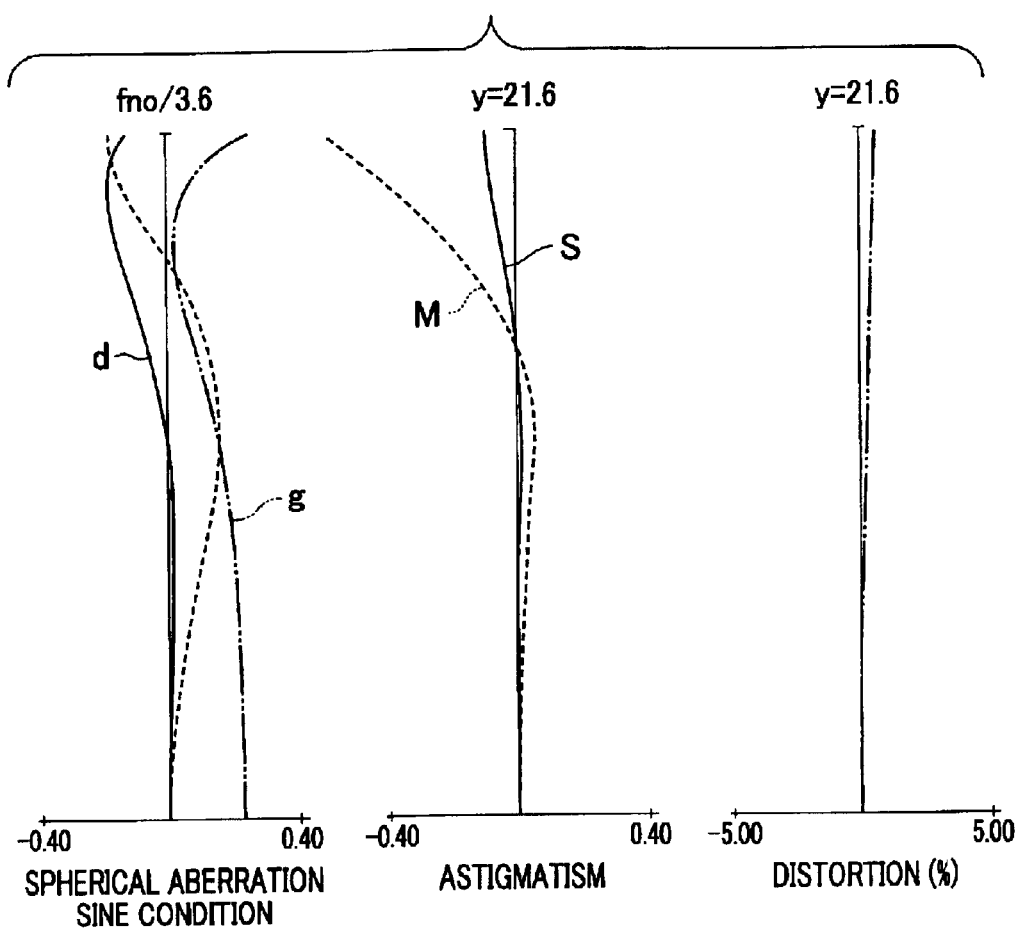
FIG. 28 consists of graphs showing the longitudinal aberration of the photographic lens according to the third embodiment in the state illustrated in FIG. 25.
Figure 29:
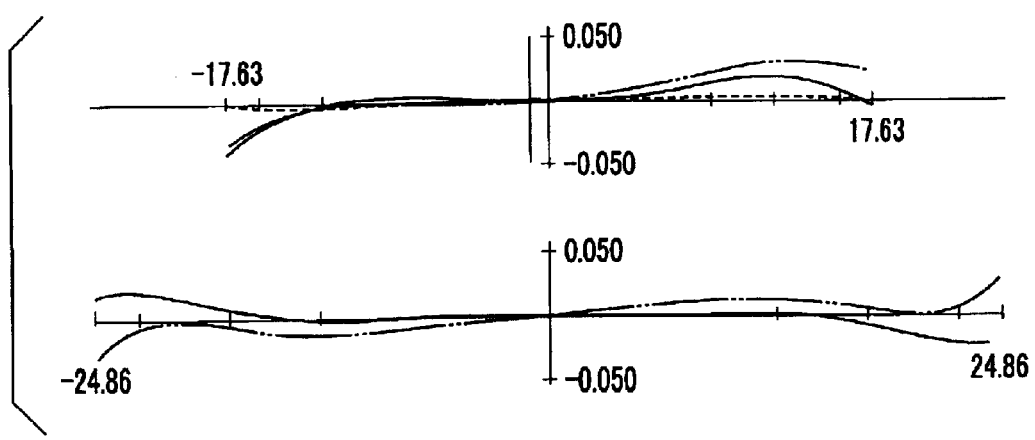
FIG. 29 consists of graphs showing the transverse aberration of the photographic lens according to the third embodiment in the state illustrated in FIG. 25.
Figure 30:
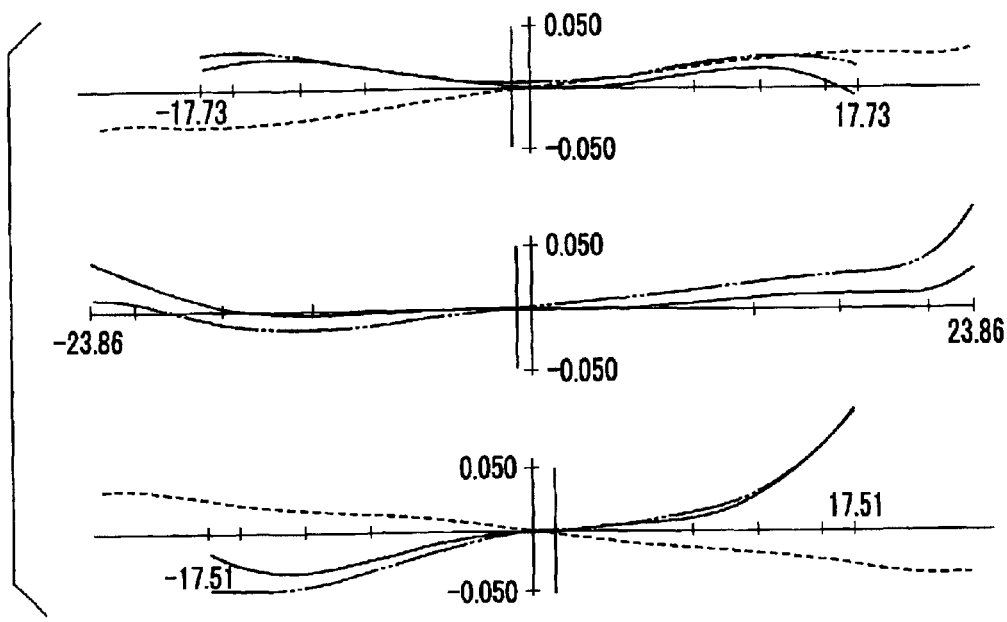
FIG. 30 consists of graphs showing the transverse aberration of the photographic lens according to the third embodiment in the state illustrated in FIG. 25 with vibration canceling (a tilt of 0.5° is corrected).
Figure 31:
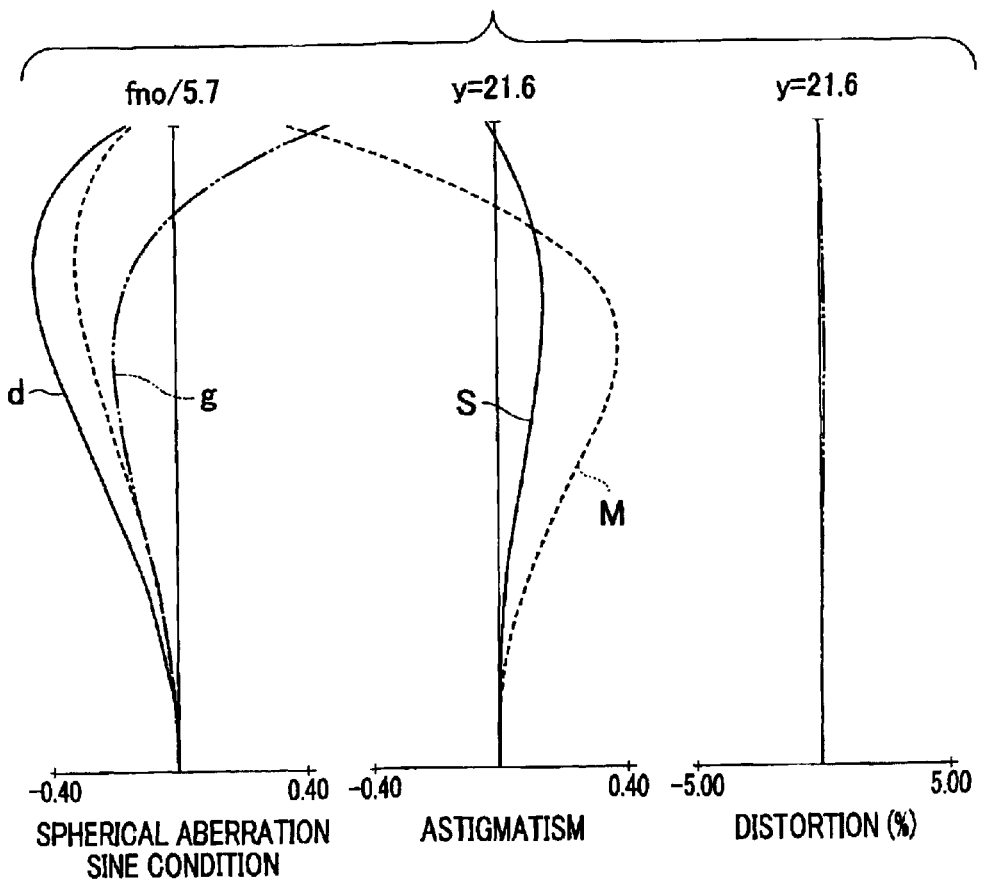
FIG. 31 consists of graphs showing the longitudinal aberration of the photographic lens according to the third embodiment in the state illustrated in FIG. 26.
Figure 32:
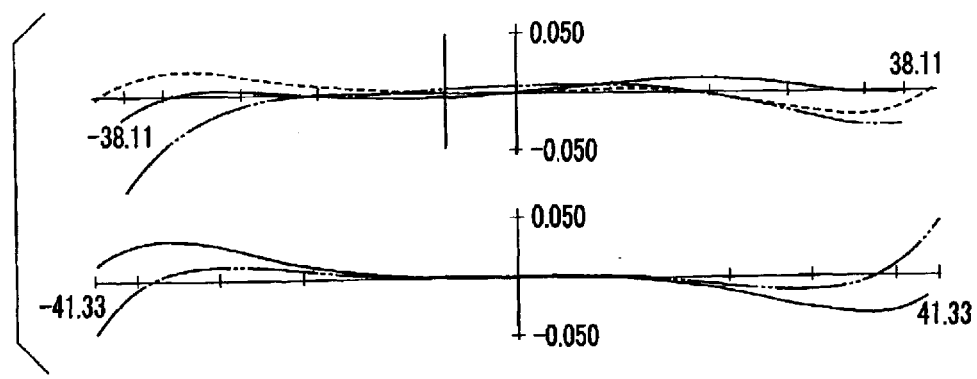
FIG. 32 consists of graphs showing the transverse aberration of the photographic lens according to the third embodiment in the state illustrated in FIG. 26.
Figure 33:
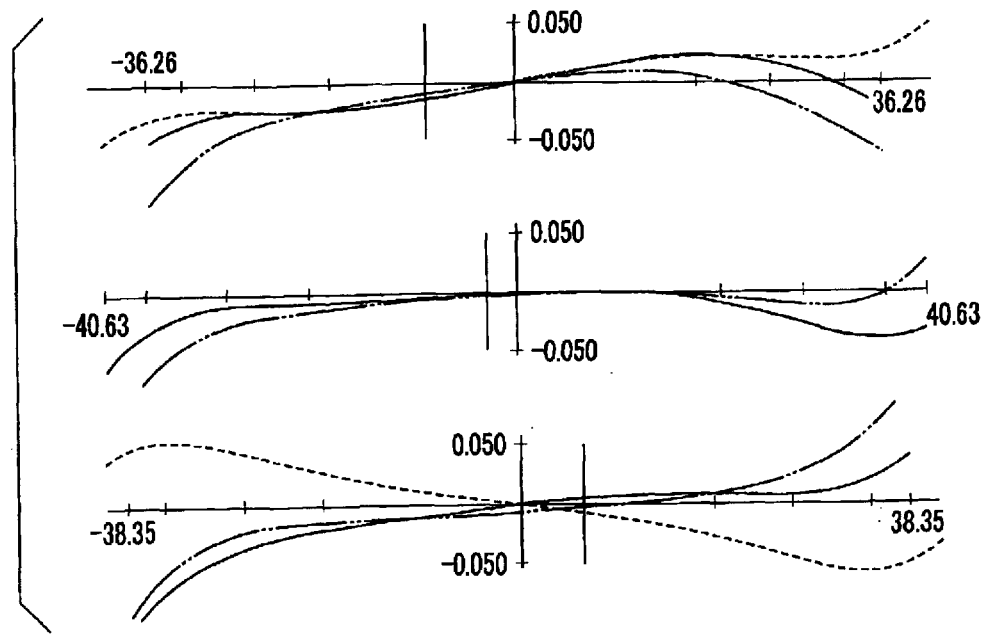
FIG. 33 consists of graphs showing the transverse aberration of the photographic lens according to the third embodiment in the state illustrated in FIG. 26 with vibration canceling (a tilt of 0.5° is corrected).
Figure 34:
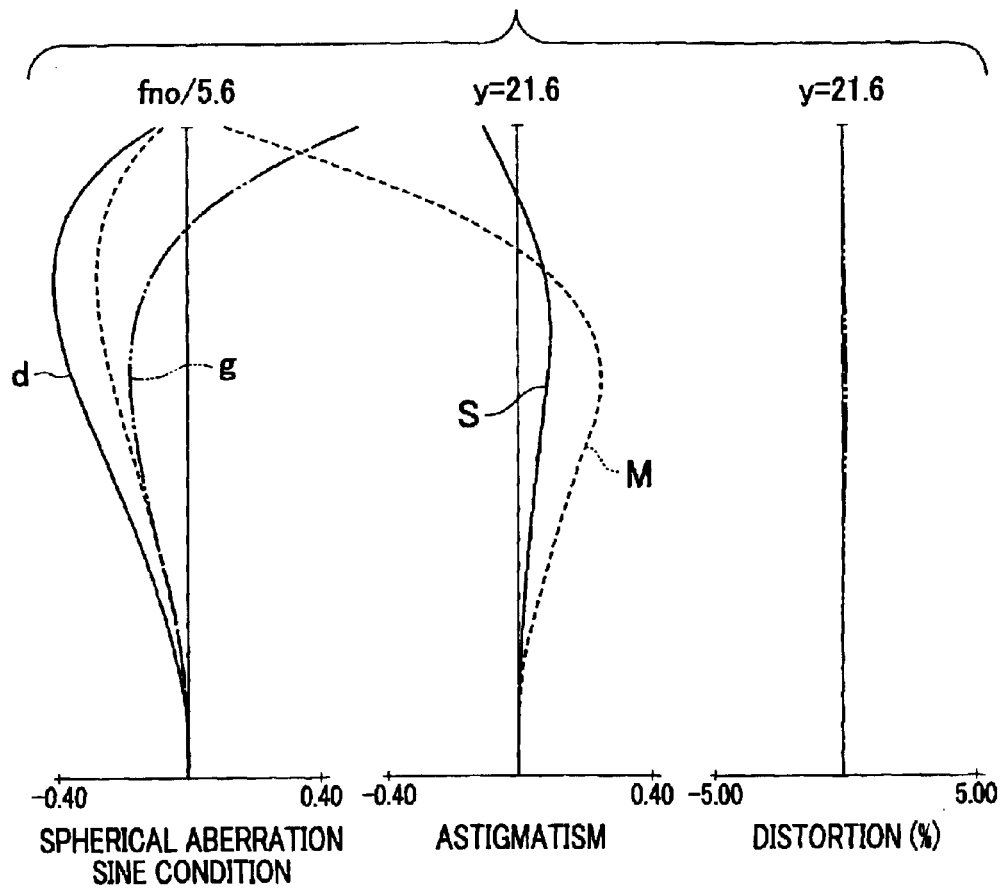
FIG. 34 consists of graphs showing the longitudinal aberration of the photographic lens according to the third embodiment in the state illustrated in FIG. 27.
Figure 35:
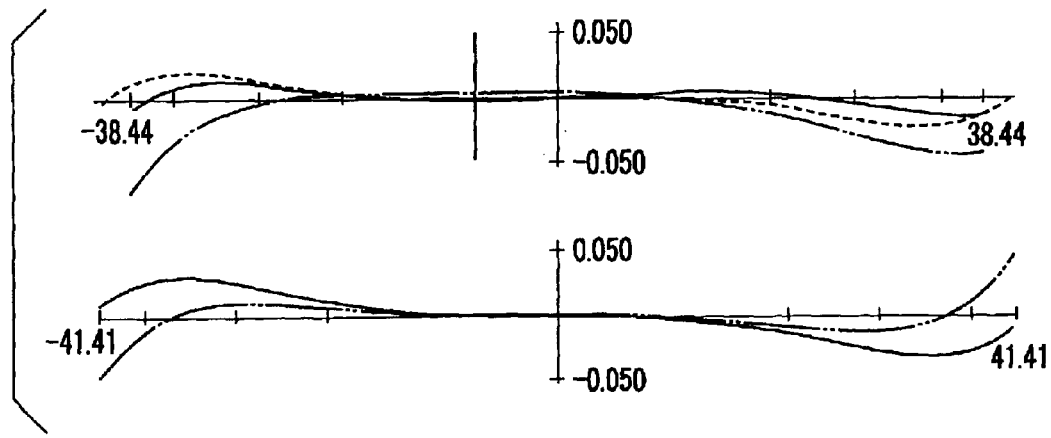
FIG. 35 consists of graphs showing the transverse aberration of the photographic lens according to the third embodiment in the state illustrated in FIG. 27.
Figure 36:
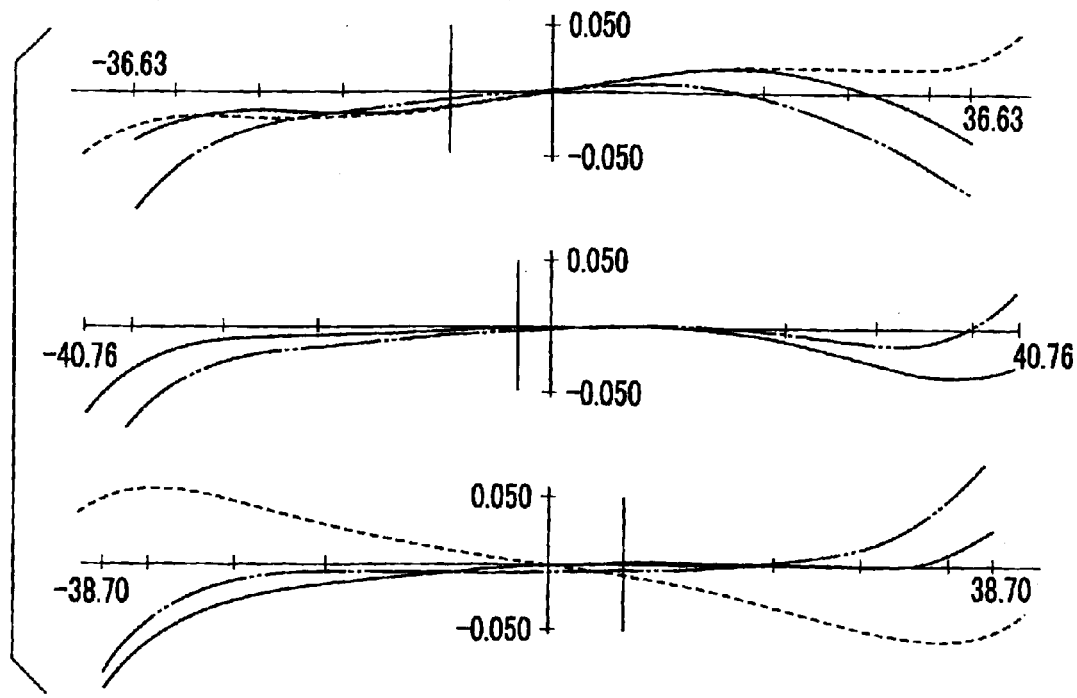
FIG. 36 consists of graphs showing the transverse aberration of the photographic lens according to the third embodiment in the state illustrated in FIG. 27 with vibration canceling (a tilt of 0.5° is corrected).

FIGS. 28 and 29 show the longitudinal aberration and the transverse aberration of the photographic lens according to the third embodiment, respectively, in the state illustrated in FIG. 25. FIG. 30 shows the transverse aberration of the photographic lens according to the third embodiment in the state illustrated in FIG. 25 with vibration canceling (a tilt of 0.5° is corrected). FIGS. 31 and 32 show the longitudinal aberration and the transverse aberration of the photographic lens according to the third embodiment, respectively, in the state illustrated in FIG. 26. FIG. 33 shows the transverse aberration of the photographic lens according to the third embodiment in the state illustrated in FIG. 26 with vibration canceling (a tilt of 0.5° is corrected). FIGS. 34 and 35 show the longitudinal aberration and the transverse aberration of the photographic lens according to the third embodiment, respectively, in the state illustrated in FIG. 27. FIG. 36 shows the transverse aberration of the photographic lens according to the third embodiment in the state illustrated in FIG. 27 with vibration canceling (a tilt of 0.5° is corrected).

In the cross sections of the photographic lens in FIGS. 1 to 3, 13 to 15, and 25 to 27, a photographic lens LZ (photographic optical system) includes a first lens unit L1 having positive refracting power (the optical power=the reciprocal of the focal length). The first lens unit L1 includes a first lens subunit L1A having positive refracting power and a second lens subunit L1B having positive refracting power; a second lens unit L2 having negative refracting power; a third lens unit L3 having positive refracting power; and a fourth lens unit L4 having positive refracting power. In each of the cross-section diagrams, the object side (the front) is to the left side and the image side thereof (the rear) is to the right side.

An aperture-stop SP is fixed or moved along the optical axis during focusing. An image plane IP is the light-sensitive surface which includes the image pickup surface of a solid-state image pickup element (photoelectric conversion element), such as a CCD (charge-coupled device) sensor or a CMOS (complementary mental-oxide semiconductor) sensor, or a light-sensitive film or the like. A flare-cut stop FP is provided on the object side of the fourth lens unit L4 to decrease the amount of flare incident on the light-sensitive surface.

The arrows in FIGS. 1, 13, and 25 indicate the moving locus of each lens unit when focusing from an infinity distant object to a close-up (closest) object is performed (photographic magnification β=−1).

In each embodiment, when focusing from an infinity distant object to a close-up object (photographic magnification β=−1) is performed with no exposure on the light-sensitive surface, as the photographic magnification increases, the second lens unit L2 is moved toward the image while the third lens unit L3 is moved toward the object. This realizes high-magnification photographic focusing on the close-up object without an increase in the amount of moving of each lens unit during focusing. The second lens unit L2 and the third lens unit L3 that perform focusing in this manner while exposure is not performed are assigned to the first focusing part.

On the other hand, while exposure is performed on the light-sensitive surface (for example, while the solid state image pickup element receives the image, light is incident on the film), or while actual photographing is performed (for example, from pressing of a release button to opening of the shutter and completion of photographing), in order to correct the displacement of the focal point due to the moving in the optical-axis direction of the photographic lens itself, the compact and lightweight fourth lens unit L4 is moved along the optical axis to perform focusing correction (focusing operation). Although the fourth lens unit L4 is not suitable for a large displacement of the object distance (such as focusing from an infinity distant object to a close-up object), since the lens is lightweight, a suitable tracking ability is obtained when correcting the focal point using the auto-focus system, the acceleration sensor, and the like. This is advantageous during focusing by a very small displacement of the object distance (high-magnification photography, for example). The fourth lens unit L4 that performs focusing during exposure of the light-sensitive surface in this manner is assigned to the second focusing part.

When blurring of the photographic image occurs due to camera-shaking or the like, the photographic lens corrects the imaging position (performs vibration canceling) by producing a moving of the second lens subunit L1B having a component in the direction perpendicular to the optical axis. "A moving of the subunit L1B having a component in the direction perpendicular to the optical axis" indicates that, for example, the second lens subunit L1B is moved perpendicular to the optical axis or rotated with respect to a predetermined point on the optical axis. As in the present embodiments, adopting the second lens subunit L1B, which is not moved during the focusing, as a vibration-canceling unit allows the mechanical structure of the system to be simplified. If vibration canceling using a more complex mechanical structure and an increased system size are permissible, not only the second lens subunit L1B, but also the other lens units and the overall lens system, can be displaced as well.

In each embodiment, the first lens subunit L1A includes, in order from the object side to the image side thereof, four lenses, that is, a positive lens with both surfaces convex, a positive lens with both surfaces convex, a negative lens with a concave surface facing the object side, and a positive lens with a convex surface facing the object side. During focusing, the first lens subunit L1A is fixed with respect to the image. The second lens subunit L1B includes, in order from the object side to the image side thereof, two lenses, that is, a negative meniscus lens with a convex surface facing the object side and a positive lens with both surfaces concave. The second lens unit L2 includes, in order from the object side to the image side thereof, a negative lens with both surfaces concave, and a cemented lens having a negative lens with both surfaces concave and a positive lens. The third lens unit L3 includes, in order from the object side to the image side thereof, a positive lens with a convex surface facing the object side and a cemented lens having a positive lens with both surfaces convex and a negative lens. The fourth lens unit L4 includes, in order from the object side to the image side thereof, two lenses, that is, a negative meniscus lens with a concave surface facing the object side and a positive lens with both surfaces convex.

As above described, the photographic lens LZ in each embodiment can correct focal point changes in the optical axis direction during exposure by moving the second focusing part. Furthermore, for decentering, even with respect to a direction other than the optical axis, by vibrating some of the lens units of the photographic system having a component in the direction perpendicular to the optical axis, blurring of the photographic image can be eliminated.

The condition described in expression (1) below is satisfied, wherein β represents the maximum photographic magnification of the photographic lens LZ in each embodiment:

$$|\beta|>0.4 \tag{1}$$

The conditions described in expressions (2) to (4) below are satisfied, wherein f1A represents the focal length of the first lens subunit L1A, f1B represents the focal length of the second lens subunit L1B, f2 represents the focal length of the second lens unit L2, f4 represents the focal length of the fourth lens unit L4, and f represents the focal length of the entire lens system when an infinity distant object is focused:

$$0.5<f1A/f1B<1.0 \tag{2}$$

$$-0.1<f2/f<0.3 \tag{3}$$

$$0.5<f4/f<1.5 \tag{4}$$

The condition described in expression (5) below is satisfied, wherein Bf represents back focus which means the light-sensitive distance between the photographic surface and a vertex of the image side surface of the lens that is closest to the image from among the lenses included in the photographic lens LZ, and f represents the focal length of the entire photographic system when an infinity distant object is focused:

$$Bf/f>0.3 \tag{5}$$

The above-mentioned conditions will be technically described below.

The photographic magnification decreases to the lower limit in expression (1) or even below, thus eliminating the necessity of forming a plurality of lens units including the second lens unit L2 and the third lens unit L3 as the first focusing lens part. Focusing can be performed using only a single lens unit as the first focusing lens part. Furthermore, since there is no need to increase the power of the first focusing lens part, focusing is performed using a small number of the lightweight lens units, thus eliminating the necessity of using the lightweight and miniaturized second focusing lens part for focusing. That is, the present invention is effective for a photographic lens that can photograph with a high magnification satisfying expression (1).

When the focal length of the first lens subunit L1A is too small compared to that of the second lens subunit L1B, thus making the ratio thereof decrease to the lower limit in expression (2) or even below, since the positive power of the first lens subunit L1A increases, the luminous flux radiated from the first lens subunit L1A converges enough before it is incident on the second lens subunit L1B. This allows the aperture of the second lens subunit L1B as well as the weight thereof to be decreased, which is advantageous for highly responsive vibration canceling. However, the spherical aberration occurring at the first lens subunit L1A becomes too small. On the other hand, when the focal length of the first lens subunit L1A is too large compared to that of the second lens subunit L1B, thus making the ratio thereof increase to the upper limit or ever greater, the correction of the spherical aberration is facilitated. However, since the power of the second lens subunit L1B becomes great, the decentering aberration due to decentering of the second lens subunit L1B from the optical axis increases and therefore deteriorates the quality of the photographic image.

The focal length of the second lens unit L2 decreases to the lower limit of expression (3) or even below, which is advantageous in terms of the spherical aberration. However, this increases the stroke (the amount of moving) during focusing on a close-up object, requiring a large torque for driving the second lens unit L2 and increasing the mechanical load. On the other hand, the focal length of the second lens unit L2 increases to the upper limit or even large, thus increasing the negative power of the second lens unit L2. This can decrease the stroke during focusing and decrease the torque required. However, this also causes an excessive increase in the diverging action of rays due to the second lens unit L2, which increases the ray height. This is disadvantageous since it increases the effective radiuses of the third lens unit L3 and the fourth lens unit L4.

When the focal length of the second lens unit L4 decreases to the lower limit of expression (4) or even below, since the power of the four lens unit L4 increases and the amount of moving thereof in the optical axis direction required for correcting the focal position decreases, a suitable tracking ability can be obtained. However, this increases the displacement of each of the aberrations, deteriorating the image quality. On the other hand, the focal length of the fourth lens unit L4 increases to the upper limit or even large, thus decreasing the power of the fourth lens unit L4, which is advantageous in terms of correcting the aberrations. However, this decreases the correcting ability of the focal position, thus requiring large amount of moving, which is disadvantageous.

Expression (5) indicates the ratio of the back focus to the focal length of the entire lens system when an infinity distant object is photographed. When the ratio decreases to the lower limit of expression (5) or below, it becomes difficult to install, for example, an attachment, between the lens body and the camera body, which is disadvantageous.

Figure 37:
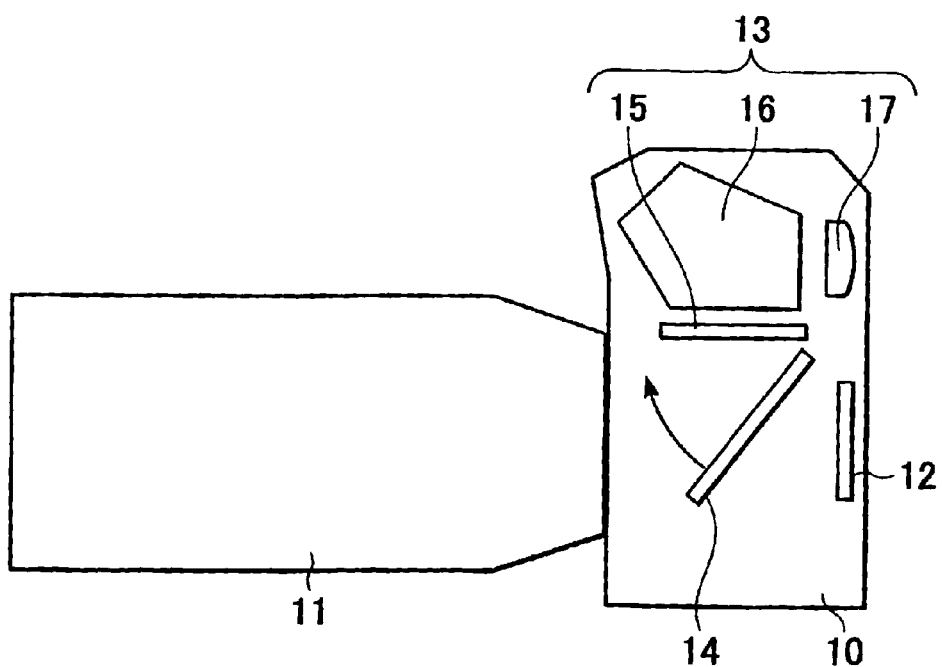
FIG. 37 is a diagram showing a general outline of a single lens reflex camera.

An embodiment of a single lens reflex (SLR) camera system on which the photographic lens according to each of the above-described embodiments can be mounted will be described with reference to FIG. 37. In FIG. 37, the camera system includes a single lens reflex camera 10 and an interchangeable lens 11 on which the above-described photographic lens is mounted, a light-sensitive unit 12, such as a silver film or a solid-state image pickup element, provided with a light-sensitive surface receiving rays from the object through the interchangeable lens 11, a finder optical system 13 for viewing the image of the object via the interchangeable lens 11, and a quick return mirror 14 that rotates to pass the image of the object from the interchangeable lens 11 to either of the light-sensitive unit 12 and the finder optical system 13 by switching between them. When the image of the object is viewed via the finder, the image of the object formed on a focusing screen 15 through the quick return mirror 14 is turned into an erect image at a pentaprism 16 and then the erect image is magnified at an eyepiece optical system 17 for viewing. During photography, the quick return mirror 14 rotates in the direction indicated by the arrow to form an image of the object on the light-sensitive surface of the light-sensitive surface unit 12 so that image information is recorded.

As described above, by applying the photographic optical system of the present invention, such as an interchangeable lens for an SLR camera, the optical device having high optical performance can be realized.

The present invention can also be applied to an SLR camera without a quick return mirror in the same manner.

Numerical examples corresponding to each of the photographic lenses according to the first to third embodiments will be described. In each example, i indicates the order of optical surfaces from the object side, ri indicates the radius of curvature of the ith optical surface (the ith surface), di indicates the distance between the ith surface and the (i+1)th surface, and ni and vi indicate the index of refraction and the Abbe number of the material of the ith optical element with respect to the D-line, respectively. f indicates the focal length, FNo indicates the F number, and ω indicates a half-angle of view. Table 1 indicates the correspondence with the above conditions in each numerical example.

NUMERICAL EXAMPLE 1 f = 180.0 FNo = 1: 3.6 2ω = 17.3° to 13.7°

| r1 = | 304.816 | d1 = | 4.29 | n1 = 1.48749 | v1 = 70.2 |
|---|---|---|---|---|---|
| r2 = | −185.124 | d2 = | 0.20 | | |
| r3 = | 126.044 | d3 = | 7.44 | n2 = 1.49700 | v2 = 81.5 |
| r4 = | −89.603 | d4 = | 2.15 | | |
| r5 = | −80.808 | d5 = | 2.70 | n3 = 1.80100 | v3 = 35.0 |
| r6 = | −506.338 | d6 = | 0.20 | | |
| r7 = | 80.402 | d7 = | 4.63 | n4 = 1.49700 | v4 = 81.5 |
| r8 = | 359.596 | d8 = | 5.83 | | |
| r9 = | 51.039 | d9 = | 2.90 | n5 = 1.80518 | v5 = 25.4 |
| r10 = | 40.198 | d10 = | 1.36 | | |
| r11 = | 52.901 | d11 = | 6.13 | n6 = 1.48749 | v6 = 70.2 |
| r12 = | −180.408 | d12 = | variable | | |
| r13 = | −242.790 | d13 = | 1.80 | n7 = 1.88300 | v7 = 40.8 |
| r14 = | 38.024 | d14 = | 5.57 | | |
| r15 = | −64.352 | d15 = | 1.60 | n8 = 1.48749 | v8 = 70.2 |
| r16 = | 42.112 | d16 = | 5.08 | n9 = 1.84666 | v9 = 23.9 |
| r17 = | −1388.605 | d17 = | variable | | |
| r18 = | aperture stop | d18 = | variable | | |
| r19 = | 35.581 | d19 = | 6.50 | n10 = 1.76200 | v10 = 40.1 |
| r20 = | ∞ | d20 = | 0.15 | | |
| r21 = | 87.733 | d21 = | 6.50 | n11 = 1.49700 | v11 = 81.5 |
| r22 = | −47.307 | d22 = | 2.00 | n12 = 1.59270 | v12 = 35.3 |
| r23 = | 23.569 | d23 = | variable | | |
| r24 = | flare stop | d24 = | 11.36 | | |
| r25 = | −30.318 | d25 = | 3.00 | n13 = 1.83400 | v13 = 37.2 |
| r26 = | −42.248 | d26 = | 0.15 | | |
| r27 = | 112.950 | d27 = | 6.50 | n14 = 1.48749 | v14 = 70.2 |
| r28 = | −62.270 | d28 = | variable | | |

| VARIABLE DISTANCE | DISTANT OBJECT | PHOTOGRAPHIC MAGNIFICATION −1.0 × FOCUSING USING FIRST FOCUSING LENS UNIT | PHOTOGRAPHIC MAGNIFICATION −1.0 × FOCUSING USING FOURTH FOCUSING LENS UNIT |
|---|---|---|---|
| d12 | 2.69 | 20.59 | 20.59 |
| d17 | 19.40 | 1.50 | 1.50 |
| d18 | 18.77 | 1.50 | 1.50 |
| d23 | 28.90 | 46.17 | 42.78 |

NUMERICAL EXAMPLE 2 f = 180.0 FNo = 1: 3.6 2ω = 16.4° to 13.7°

| r1 = | 279.775 | d1 = | 4.26 | n1 = 1.48749 | v1 = 70.2 |
|---|---|---|---|---|---|
| r2 = | −186.595 | d2 = | 0.20 | | |
| r3 = | 110.269 | d3 = | 7.28 | n2 = 1.49700 | v2 = 81.5 |
| r4 = | −97.507 | d4 = | 2.15 | | |
| r5 = | −86.393 | d5 = | 2.70 | n3 = 1.80100 | v3 = 35.0 |
| r6 = | −635.935 | d6 = | 0.20 | | |
| r7 = | 76.257 | d7 = | 4.16 | n4 = 1.49700 | v4 = 81.5 |
| r8 = | 231.844 | d8 = | 4.16 | | |
| r9 = | 51.076 | d9 = | 2.90 | n5 = 1.80518 | v5 = 25.4 |
| r10 = | 39.965 | d10 = | 1.32 | | |
| r11 = | 52.060 | d11 = | 6.10 | n6 = 1.48749 | v6 = 70.2 |
| r12 = | −185.722 | d12 = | variable | | |
| r13 = | −237.871 | d13 = | 1.80 | n7 = 1.88300 | v7 = 40.8 |
| r14 = | 37.154 | d14 = | 5.41 | | |
| r15 = | −74.883 | d15 = | 1.60 | n8 = 1.48749 | v8 = 70.2 |
| r16 = | 39.723 | d16 = | 5.08 | n9 = 1.84666 | v9 = 23.9 |
| r17 = | 1102.912 | d17 = | variable | | |
| r18 = | aperture stop | d18 = | variable | | |
| r19 = | 35.225 | d19 = | 6.50 | n10 = 1.76200 | v10 = 40.1 |
| r20 = | ∞ | d20 = | 0.15 | | |
| r21 = | 91.321 | d21 = | 6.50 | n11 = 1.49700 | v11 = 81.5 |
| r22 = | −46.982 | d22 = | 2.00 | n12 = 1.59270 | v12 = 35.3 |
| r23 = | 23.402 | d23 = | variable | | |
| r24 = | flare stop | d24 = | 11.36 | | |
| r25 = | −29.524 | d25 = | 3.00 | n13 = 1.83400 | v13 = 37.2 |
| r26 = | −40.413 | d26 = | 0.15 | | |
| r27 = | 132.537 | d27 = | 6.28 | n14 = 1.48749 | v14 = 70.2 |
| r28 = | −55.659 | | | | |

| VARIABLE DISTANCE | DISTANT OBJECT | PHOTOGRAPHIC MAGNIFICATION −1.0 × FOCUSING USING FIRST FOCUSING LENS UNIT | PHOTOGRAPHIC MAGNIFICATION −1.0 × FOCUSING USING FOURTH FOCUSING LENS UNIT |
|---|---|---|---|
| d12 | 3.18 | 20.84 | 20.84 |
| d17 | 19.23 | 1.56 | 1.56 |
| d18 | 16.89 | 1.50 | 1.50 |
| d23 | 33.24 | 48.64 | 44.62 |

NUMERICAL EXAMPLE 3 f = 180.0  FNo = 1: 3.6  2ω = 15.4° to 13.7°

| | | | | | | | |
|---|---|---|---|---|---|---|---|
| r1 = | 219.806 | d1 = | 4.75 | n1 = 1.48749 | ν1 = | 70.2 |
| r2 = | −167.403 | d2 = | 0.20 | | | |
| r3 = | 96.493 | d3 = | 7.61 | n2 = 1.49700 | ν2 = | 81.5 |
| r4 = | −115.166 | d4 = | 2.15 | | | |
| r5 = | −97.473 | d5 = | 2.70 | n3 = 1.80100 | ν3 = | 35.0 |
| r6 = | −2344.029 | d6 = | 0.20 | | | |
| r7 = | 77.432 | d7 = | 3.43 | n4 = 1.49700 | ν4 = | 81.5 |
| r8 = | 188.682 | d8 = | 4.60 | | | |
| r9 = | 51.519 | d9 = | 2.90 | n5 = 1.80518 | ν5 = | 25.4 |
| r10 = | 39.733 | d10 = | 1.17 | | | |
| r11 = | 50.039 | d11 = | 6.08 | n6 = 1.48749 | ν6 = | 70.2 |
| r12 = | −190.512 | d12 = | variable | | | |
| r13 = | −230.154 | d13 = | 1.80 | n7 = 1.88300 | ν7 = | 40.8 |
| r14 = | 36.736 | d14 = | 5.18 | | | |
| r15 = | −80.910 | d15 = | 1.60 | n8 = 1.48749 | ν8 = | 70.2 |
| r16 = | 38.024 | d16 = | 4.96 | n9 = 1.84666 | ν9 = | 23.9 |
| r17 = | 460.489 | d17 = | variable | | | |
| r18 = | aperture stop | d18 = | variable | | | |
| r19 = | 34.710 | d19 = | 6.50 | n10 = 1.76200 | ν10 = | 40.1 |
| r20 = | ∞ | d20 = | 0.15 | | | |
| r21 = | 98.551 | d21 = | 6.50 | n11 = 1.49700 | ν11 = | 81.5 |
| r22 = | −46.380 | d22 = | 2.00 | n12 = 1.59270 | ν12 = | 35.3 |
| r23 = | 23.152 | d23 = | variable | | | |
| r24 = | flare stop | d24 = | 11.36 | | | |
| r25 = | −29.447 | d25 = | 3.00 | n13 = 1.83400 | ν13 = | 37.2 |
| r26 = | −39.203 | d26 = | 0.15 | | | |
| r27 = | 120.767 | d27 = | 6.50 | n14 = 1.48749 | ν14 = | 70.2 |
| r28 = | −58.015 | d28 = | variable | | | |

| VARIABLE DISTANCE | DISTANT OBJECT | PHOTOGRAPHIC MAGNIFICATION 1.0 × FOCUSING USING FIRST FOCUSING LENS UNIT | PHOTOGRAPHIC MAGNIFICATION 1.0 × FOCUSING USING FOURTH FOCUSING LENS UNIT |
|---|---|---|---|
| d12 | 2.71 | 20.06 | 20.06 |
| d17 | 18.99 | 1.64 | 1.64 |
| d18 | 17.49 | 1.50 | 1.50 |
| d23 | 33.11 | 49.11 | 46.83 |

TABLE 1

| | | NUMERICAL EXAMPLES | | |
|---|---|---|---|---|
| CONDITIONS | | 1 | 2 | 3 |
| (1) | \|β\| | 1.0 | 1.0 | 1.0 |
| (2) | f1A/f1B | 0.77 | 0.76 | 0.74 |
| (3) | f2/f | −0.22 | −0.22 | −0.21 |
| (4) | f4/f | 0.94 | 0.86 | 0.79 |
| (5) | Bf/f | 0.38 | 0.39 | 0.38 |

The above-described embodiments realize a photographic lens with an aperture ratio having an angle of view of approximately 24° and an F Number of approximately 3.5, which are suitable for a photographic camera, a video camera, a digital still camera, and the like. In particular, there can be obtained a photographic lens that has high optical performance in which excellent aberration correction is achieved when focusing is performed over a wide range of objects from an infinity distant object to a close-up object at a photographic magnification of 1.0, that can correct displacements in focal position during exposure, and that can easily correct blurring of the photographic image plane due to camera-shaking or the like.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A photographic optical system for forming an image of an object on a light-sensitive surface, said photographic optical system comprising:

a first focusing part for focusing while exposure is not performed on the light-sensitive surface; and a second focusing part for focusing while exposure is performed on the light-sensitive surface, wherein said first focusing part includes a lens unit that moves for focusing and that is not included in said second focusing part, and said second focusing part includes a lens unit that moves for focusing and that is not included in said first focusing part.

2. A photographic optical system according to claim 1, wherein said first focusing part comprises a plurality of subunits that independently move along an optical axis during focusing.

3. A photographic optical system according to claim 1, further comprising a unit that moves so as to have a component in the direction perpendicular to an optical axis.

4. A photographic optical system according to claim 1, wherein the condition $$|\beta| > 0.4$$

is satisfied, where $\beta$ represents the maximum magnification of said photographic optical system.

5. A photographic optical system according to claim 1, wherein said photographic optical system forms the image on the light-sensitive surface of a photoelectric conversion element.

6. A photographic optical system for forming an image of an object on a light-sensitive surface, said photographic optical system comprising, in order from the object side to the image side thereof:

a first lens unit having positive optical power;

a second lens unit having negative optical power;

a third lens unit having positive optical power; and a fourth lens unit having positive optical power, wherein said second lens unit moves along an optical axis toward the image side, and said third lens unit moves along the optical axis toward the object side while focusing from an infinity distant object to a closest object, and wherein said fourth lens unit moves along the optical axis so as to correct the displacement in image position while exposure is performed on the light-sensitive surface.

7. A photographic optical system according to claim 6, wherein:

said first lens unit comprises, in order from the object side to the image side, a first lens subunit having positive optical power and a second lens subunit having positive optical power, wherein said second lens subunit can move so as to have a component in the direction perpendicular to the optical axis.

8. A photographic optical system according to claim 7, wherein the condition $$0.5 < f1A/f1B < 1.0$$

is satisfied, where f1A represents the focal length of said first lens subunit and f1B represents the focal length of said second lens subunit.

9. A photographic optical system according to claim 7, wherein said first lens subunit does not move along the optical axis for focusing.

10. A photographic optical system according to claim 7, wherein said second lens subunit comprises a positive lens element and a negative lens element.

11. A photographic optical system according to claim 6, wherein the condition $$|\beta|>0.4$$

is satisfied, where $\beta$ represents the maximum magnification of said photographic optical system.

12. A photographic optical system according to claim 6, wherein the condition $$-0.3<f2/f<-0.1$$

is satisfied, where f2 represents the focal length of said second lens unit and f represents the focal length of the entirety of said photographic optical system.

13. A photographic optical system according to claim 6, wherein the condition $$0.5<f4/f<1.5$$

is satisfied, where f4 represents the focal length of said fourth lens unit and f represents the focal length of the entirety of said photographic optical system.

14. A photographic optical system according to claim 6, wherein the condition $$Bf/f>0.3$$

is satisfied, where Bf represents the distance between the light-sensitive surface and a vertex of the image-side surface of the lens element that is closest to the image from among the lens elements included in said photographic optical system, and f represents the focal length of the entirety of said photographic optical system.

15. A photographic optical system according to claim 6, wherein said photographic optical system forms the image on the light-sensitive surface of a solid-state image pickup element.

* * * * *

UNITED STATES PATENT AND TRADEMARK OFFICE
CERTIFICATE OF CORRECTION

PATENT NO. : 6,825,994 B2
DATED : November 30, 2004
INVENTOR(S) : Akira Harada

It is certified that error appears in the above-identified patent and that said Letters Patent is hereby corrected as shown below:

Title page,
Item [57], ABSTRACT,
Line 6, "correct" should read -- corrects --.

Column 6,
Line 23, "mental-oxide" should read -- metal-oxide --.

Column 9,
Line 1, "large" should read -- larger --.

Signed and Sealed this

Twenty-fourth Day of May, 2005

JON W. DUDAS
*Director of the United States Patent and Trademark Office*